US012764043B2

(12) United States Patent
Seck et al.

(10) Patent No.: US 12,764,043 B2

(45) Date of Patent: Oct. 13, 2026

(54) AUTOMATED TICKET CREATION AND ASSIGNMENT FOR CLOUD-BASED APPLICATIONS

(71) Applicant: Capital One Services, LLC, McLean, VA (US)

(72) Inventors: Mohamed Seck, Aubrey, TX (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 98 days.

(21) Appl. No.: 18/980,286

(22) Filed: Dec. 13, 2024

(65) Prior Publication Data

US 2025/0112839 A1 Apr. 3, 2025

Related U.S. Application Data

(62) Division of application No. 18/358,679, filed on Jul. 25, 2023, now Pat. No. 12,177,095.

(51) Int. Cl.

| | |
|---|---|
| ***G06F 15/16*** | (2006.01) |
| ***H04L 41/0604*** | (2022.01) |
| ***H04L 41/5074*** | (2022.01) |

(52) U.S. Cl.

CPC ...... *H04L 41/5074* (2013.01); *H04L 41/0613* (2013.01)

(58) Field of Classification Search

CPC ........................ H04L 41/0613; H04L 41/5074

USPC .......................................................... 709/224

See application file for complete search history.

(56) References Cited

U.S. PATENT DOCUMENTS

| | | | |
|---|---|---|---|
| 8,290,362 | B2 | 10/2012 | Mayo et al. |
| 8,873,946 | B2 | 10/2014 | Mayo et al. |
| 9,032,181 | B2 * | 5/2015 | Ahmad ............... G06F 12/1018 711/203 |
| 9,886,195 | B2 | 2/2018 | Zhuang et al. |
| 9,934,286 | B2 * | 4/2018 | Roth ................. G06F 16/24578 |
| 10,261,960 | B2 * | 4/2019 | Regni ................... G06F 16/128 |
| 10,372,924 | B2 * | 8/2019 | Madathilparambil George .......... G06F 21/6218 |
| 10,417,717 | B2 * | 9/2019 | Yu ....................... G06F 16/3329 |
| 10,817,421 | B2 * | 10/2020 | Talagala .............. G06F 12/0804 |
| 10,873,503 | B2 | 12/2020 | Jadhav |

(Continued)

OTHER PUBLICATIONS

Co-pending U.S. Appl. No. 18/358,679, inventors Seck; Mohamed et al., filed on Jul. 25, 2023.

*Primary Examiner* — Moustafa M Meky

(74) *Attorney, Agent, or Firm* — Harrity & Harrity, LLP

(57) ABSTRACT

In some implementations, a remediation engine may verify and update data structures for cloud-based applications. The remediation engine may receive the data structure, may verify team names and user identifiers against lists of valid entries, and may update the data structure by removing inactive entries and indicating backup users if necessary. The updated data structure may be provided for processing alerts and may be integrated with ticket management systems to automate the creation and assignment of tickets. This approach may efficiently manage security vulnerabilities in cloud-based applications by maintaining valid user assignments and categories relevant to the cloud environment, thereby reducing unnecessary communications and conserving power, processing resources, and network resources.

20 Claims, 19 Drawing Sheets

(56) References Cited

U.S. PATENT DOCUMENTS

| | | | | |
|---|---|---|---|---|
| 10,924,390 | B2 * | 2/2021 | LaVigne | H04L 47/125 |
| 11,435,994 | B1 | 9/2022 | Gunda et al. | |
| 11,463,444 | B2 * | 10/2022 | Stephens | H04L 63/105 |
| 11,675,611 | B2 * | 6/2023 | Agrawal | G06F 9/485<br>718/1 |
| 11,907,200 | B2 * | 2/2024 | Talagala | G06F 16/2365 |
| 11,934,284 | B2 | 3/2024 | Chauhan et al. | |
| 11,935,071 | B2 | 3/2024 | Suryanarayana et al. | |
| 2005/0203976 | A1 | 9/2005 | Hyun et al. | |
| 2010/0299667 | A1 * | 11/2010 | Ahmad | G06F 12/1018<br>718/1 |
| 2016/0179820 | A1 * | 6/2016 | Roth | G06F 16/248<br>707/723 |
| 2020/0145325 | A1 * | 5/2020 | LaVigne | H04L 47/125 |
| 2020/0364242 | A1 * | 11/2020 | Martin | H04L 43/067 |
| 2021/0392142 | A1 * | 12/2021 | Stephens | H04L 63/104 |
| 2023/0385436 | A1 * | 11/2023 | Madathilparambil George | G06F 9/468 |

* cited by examiner

700

AUTOMATED TICKET CREATION AND ASSIGNMENT FOR CLOUD-BASED APPLICATIONS

RELATED APPLICATION

This application is a division of U.S. patent application Ser. No. 18/358,679, filed Jul. 25, 2023 (now U.S. Pat. No. 12,177,095), which is incorporated herein by reference in its entirety.

BACKGROUND

Security vulnerabilities may arise when cloud-based applications are due for security patches or other software updates. Similarly, security vulnerabilities may arise, for example, when cloud-based images that support cloud-based applications are not refreshed (e.g., by having instances based on those images rebooted, rehydrated, or otherwise reestablished).

SUMMARY

Some implementations described herein relate to a system for automatically generating and assigning a ticket associated with a cloud-based application. The system may include one or more memories and one or more processors communicatively coupled to the one or more memories. The one or more processors may be configured to receive an indication of an alert associated with the cloud-based application. The one or more processors may be configured to determine, using a data structure that maps application identifiers to user identifiers, a corresponding user associated with the cloud-based application. The one or more processors may be configured to determine, using the data structure, a corresponding category associated with the cloud-based application, wherein the data structure further maps the application identifiers to categories. The one or more processors may be configured to determine, using the data structure, a corresponding label associated with the alert, wherein the data structure further maps types of alerts to labels. The one or more processors may be configured to transmit, to a ticket management system, a command to generate the ticket associated with the cloud-based application, wherein the ticket includes the corresponding label, indicates the corresponding category, and tags the corresponding user.

Some implementations described herein relate to a method of creating a data structure for a cloud-based application. The method may include receiving an indication of the cloud-based application. The method may include generating the data structure for the cloud-based application. The method may include receiving an indication of a corresponding user. The method may include updating the data structure to associate the corresponding user with the cloud-based application. The method may include receiving an indication of a corresponding category. The method may include updating the data structure to associate the corresponding category with the cloud-based application. The method may include receiving an indication of a first label and an indication of a first module of the cloud-based application. The method may include updating the data structure to associate the first label with the first module of the cloud-based application. The method may include providing the data structure for processing alerts associated with the cloud-based application.

Some implementations described herein relate to a non-transitory computer-readable medium that stores a set of instructions for verifying a data structure for a cloud-based application. The set of instructions, when executed by one or more processors of a device, may cause the device to receive the data structure for the cloud-based application. The set of instructions, when executed by one or more processors of the device, may cause the device to verify whether a team name, indicated in the data structure as associated with the cloud-based application, is included on a list of valid team names. The set of instructions, when executed by one or more processors of the device, may cause the device to verify whether a user, indicated in the data structure as associated with the cloud-based application, is included on a list of valid users. The set of instructions, when executed by one or more processors of the device, may cause the device to provide the data structure, for processing alerts associated with the cloud-based application, based on verifying the team name and verifying the user.

DETAILED DESCRIPTION

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when the cloud-based applications are due for security patches or other software updates. Similarly, cloud-based applications may experience vulnerabilities when corresponding cloud-based images (used, for example, to create cloud instances) are not periodically refreshed (e.g., by having instances based on those images rebooted, rehydrated, or otherwise reestablished). When cloud-based images are not refreshed, they may be referred to as "stale" and cloud-based applications relying on the images may be more susceptible to cyberattacks.

Technical administrators may collect information regarding vulnerabilities associated with ASVs from corresponding cloud environments. However, these administrators may be required to communicate the vulnerabilities to users, who can then authorize security patches (or other software updates) and can refresh the cloud-based images. Additionally, the administrators generally must trigger communications about the vulnerabilities to the users. Some automated techniques may generate these communications according to one or more rules. However, sending communications to users who are no longer active or to users who are not responsible for a corresponding ASV, among other examples, wastes power, processing resources, and network resources.

By providing communications to users determined based on an updated data structure, user experience is improved, and the users are more likely to perform remediation. Some implementations described herein enable a remediation system to generate data structures that map cloud-based applications, categories, modules, and/or labels to different users. As a result, power, processing resources, and network resources are conserved that otherwise would have been wasted in transmitting communications to unnecessary users.

Providing visual user interfaces (UIs) that allow users to quickly and easily update the data structures further improves user experience, and the users are more likely to update the data structures. Additionally, automated error checking and correction in the data structures removes inactive users from the data structures. As a result, power, processing resources, and network resources are conserved that otherwise would have been wasted in transmitting communications to inactive users.

Figure 1A:
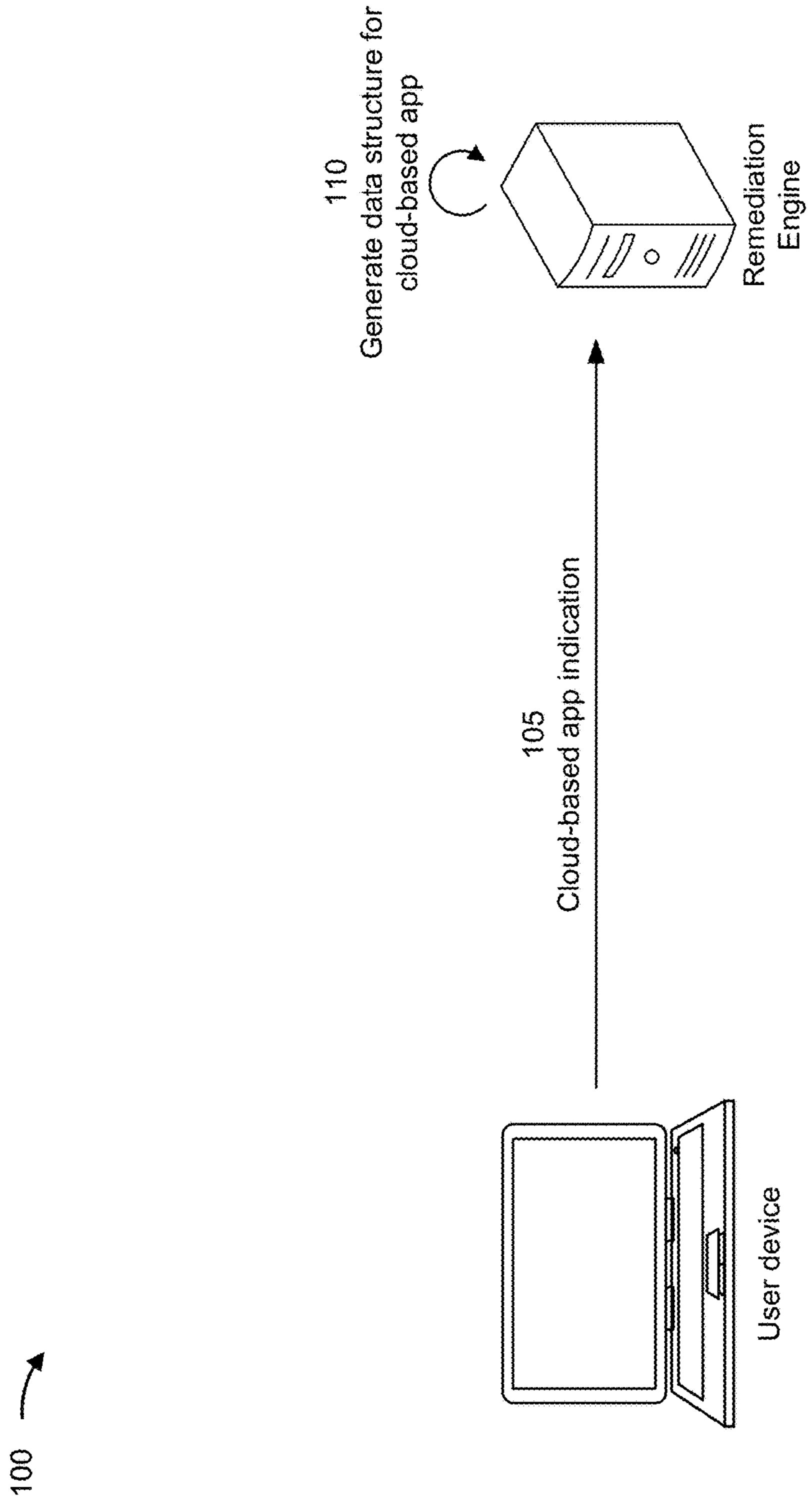
FIGS. 1A-1C are diagrams of an example implementation relating to generating and verifying data structures for cloud-based applications, in accordance with some embodiments of the present disclosure.
Figure 1B:
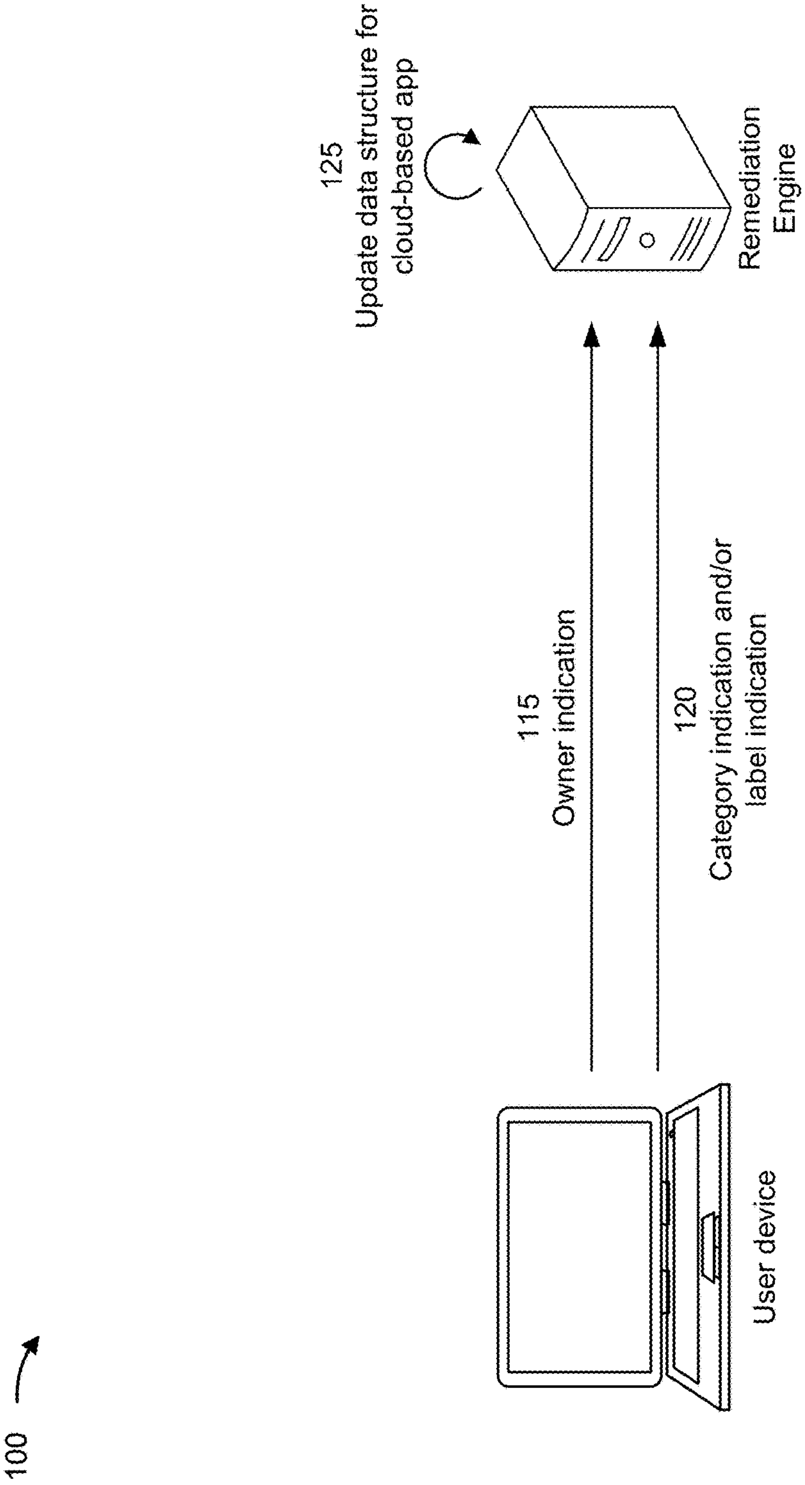
Figure 1C:
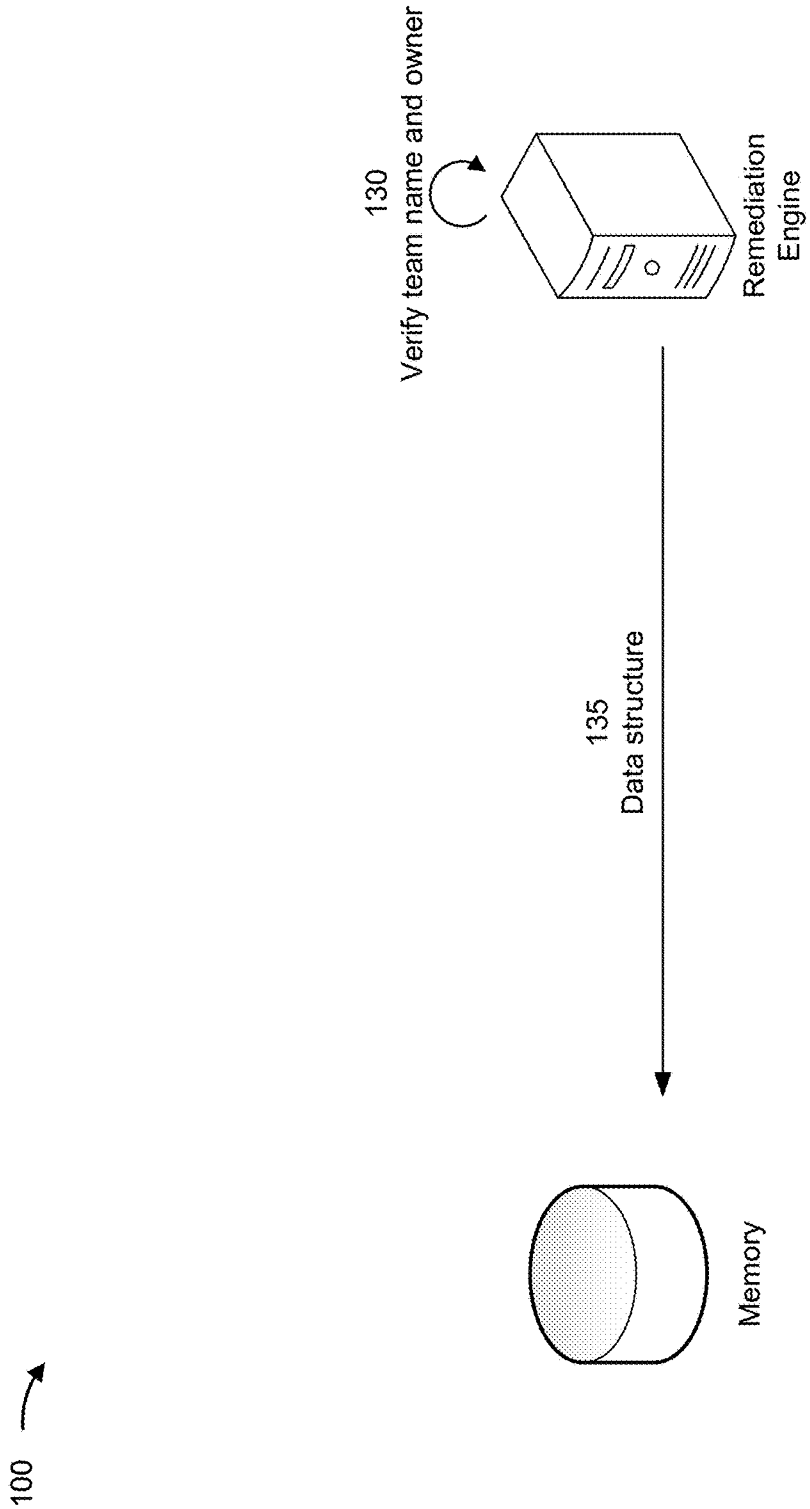

FIGS. 1A-1C are diagrams of an example 100 associated with generating and verifying data structures for cloud-based applications. As shown in FIGS. 1A-1C, example 100 includes a user device and a remediation engine. These devices are described in more detail in connection with FIGS. 8 and 9.

As shown in FIG. 1A and by reference number 105, the user device may transmit, and the remediation engine may receive, an indication of a cloud-based application. For example, the indication may include an identifier (e.g., an alphanumeric identifier) associated with the cloud-based application. The indication may be included in a hypertext transfer protocol (HTTP) message and/or as an argument of an application programming interface (API) call, among other examples.

In some implementations, a user of the user device (e.g., an administrator associated with the cloud-based application) may interact with a UI (e.g., via a keyboard, a mouse, a touchscreen, or another type of input component) and trigger the user device to transmit the indication. For example, the UI may be as described in connection with FIG. 5C or FIG. 6A. Accordingly, the remediation engine may transmit instructions for the UI to the user device, and the user device may transmit the indication after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication after showing the website to the user and in response to the user interacting with the website.

As shown by reference number 110, the remediation engine may generate a data structure for the cloud-based application. As described in connection with FIG. 4, the data structure may include a tree structure. For example, teams of users may represent branches that are connected to a common trunk (or root) representing the cloud-based application. Other relational structures may include a graph or another structured data type. The remediation engine may generate the data structure in response to the indication from the user device, as described in connection with reference number 105. Additionally, or alternatively, the user of the user device (e.g., the administrator associated with the cloud-based application) may interact (e.g., via a keyboard, a mouse, a touchscreen, or another type of input component) with a confirmation element, as described in connection with FIG. 5C or FIG. 6A, and trigger the user device to transmit a confirmation message. Accordingly, the remediation engine may generate the data structure in response to the confirmation message.

As shown in FIG. 1B and by reference number 115, the user device may transmit, and the remediation engine may receive, an indication of a corresponding user, such as an owner, for the cloud-based application. For example, the indication may include an identifier (e.g., a username associated with a communication service, such as Slack® or Microsoft Teams®, a username associated with an organization managing the cloud-based application, and/or an email address, among other examples) associated with the corresponding user. The indication may be included in an HTTP message and/or as an argument of an API call, among other examples. Although the example 100 includes the indication of the corresponding user separate from the indication of the cloud-based application, other examples may include both indications in a same message.

In some implementations, the user of the user device (e.g., the administrator associated with the cloud-based application) may interact with a UI (e.g., via a keyboard, a mouse, a touchscreen, or another type of input component) and trigger the user device to transmit the indication. For example, the UI may be as described in connection with FIG. 6B. Accordingly, the remediation engine may transmit instructions for the UI to the user device, and the user device may transmit the indication after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication after showing the website to the user and in response to the user interacting with the website.

In some implementations, the user device may transmit an indication of multiple users (or multiple indications of multiple users). For example, as described in connection with FIG. 6B, the user device may indicate an additional user to receive communications associated with the cloud-based application in addition to the corresponding user (e.g., the owner). In another example, the user device may indicate a supervisor of the corresponding user or another type of backup user. Accordingly, the remediation engine may use the backup user as described in connection with reference number 130.

As shown by reference number 120, the user device may transmit, and the remediation engine may receive, an indication of a corresponding category for the cloud-based application. For example, the indication may include a string associated with a story or an epic (e.g., as used in Jira® or another type of issue tracking software) associated with the cloud-based application. The indication may be included in an HTTP message and/or as an argument of an API call, among other examples. Although the example 100 includes the indication of the corresponding user separate from the indication of the cloud-based application, other examples may include both indications in a same message.

In some implementations, the user of the user device (e.g., the administrator associated with the cloud-based application) may interact with a UI (e.g., via a keyboard, a mouse, a touchscreen, or another type of input component) and trigger the user device to transmit the indication of the corresponding category. For example, the UI may be as described in connection with FIG. 6A. Accordingly, the remediation engine may transmit instructions for the UI to the user device, and the user device may transmit the indication of the corresponding category after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication of the corresponding category after showing the website to the user and in response to the user interacting with the website.

The corresponding category may be associated with the cloud-based application in general. Additionally, or alternatively, the user device may transmit an indication of multiple categories (or multiple indications of multiple categories), such that different modules of the cloud-based application are associated with different categories. For example, one module of the cloud-based application may be associated with a corresponding cloud-based storage supporting the application, another module of the cloud-based application may be associated with a data set used by the cloud-based application, and yet another module of the cloud-based application may be associated with an API managed by the cloud-based application, among other examples. Accordingly, the user device may indicate a category for each module in addition to, or in lieu of, a global category associated with the cloud-based application in general.

As further shown by reference number 120, the user device may transmit, and the remediation engine may receive, an indication of labels (e.g., one or more labels) for the cloud-based application. For example, the indication may include strings, representing the labels, associated with the cloud-based application. The indication may be included in an HTTP message and/or as an argument of an API call, among other examples. Although the example 100 includes the indication of the labels separate from the indication of the cloud-based application, other examples may include both indications in a same message.

In some implementations, the user of the user device (e.g., the administrator associated with the cloud-based application) may interact with a UI (e.g., via a keyboard, a mouse, a touchscreen, or another type of input component) and trigger the user device to transmit the indication of the labels. For example, the UI may be as described in connection with FIG. 6A. Accordingly, the remediation engine may transmit instructions for the UI to the user device, and the user device may transmit the indication of the labels after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication of the labels after showing the website to the user and in response to the user interacting with the website.

The labels may be associated with the cloud-based application in general. Additionally, or alternatively, the user device may transmit an indication of multiple labels (or multiple indications of multiple labels), such that different modules of the cloud-based application are associated with different labels. For example, one module of the cloud-based application may be associated with a corresponding cloud-based storage supporting the application, another module of the cloud-based application may be associated with a data set used by the cloud-based application, and yet another module of the cloud-based application may be associated with an API managed by the cloud-based application, among other examples. Accordingly, the user device may indicate a label for each module in addition to, or in lieu of, a global label associated with the cloud-based application in general.

As shown by reference number 125, the remediation engine may update the data structure to associate the corresponding user with the cloud-based application. Additionally, the remediation engine may update the data structure to associate the additional user (and/or the backup user) with the cloud-based application, associate the corresponding category with the cloud-based application (and/or modules of the cloud-based application), and associate the labels with the cloud-based application (and/or modules of the cloud-based application). As described in connection with FIG. 4, the corresponding user (and/or the additional user and/or the backup user) may be indicated in a node, representing a team, that is connected to a node representing the cloud-based application. Additionally, as further described in connection with FIG. 4, categories and labels may be indicated in the node representing the team or in a node (representing a module of the cloud-based application) that is connected to the node representing the team.

Although the example 100 is described in connection with the remediation engine updating the data structure, other examples may include the remediation engine generating the data structure with any associations described herein (e.g., for the corresponding user, the additional user, the corresponding category, and/or the label(s), among other examples). For example, the remediation engine may refrain from generating the data structure until receiving additional indications described herein (e.g., of the corresponding user, the additional user, the corresponding category, and/or the label(s), among other examples). Additionally, or alternatively, the remediation engine may refrain from generating the data structure until receiving a confirmation message from the user device (e.g., as described above), and the user device may transmit the additional indications described herein before transmitting the confirmation message.

As shown in FIG. 1C and by reference number 130, the remediation engine may perform verifications on the data structure. For example, the remediation engine may verify whether a team name, indicated in the data structure as associated with the cloud-based application, is included on a list of valid team names. The remediation engine may access the list of valid team names from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the list of valid team names.

Additionally, or alternatively, the remediation engine may verify whether a user, indicated in the data structure as associated with the cloud-based application, is included on a list of valid users. The remediation engine may access the list of valid users from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the list of valid users. The storage with the valid users may be the same storage that has the list of valid team names or may be a different storage.

In some implementations, when a verification fails, the remediation engine may transmit, and the user device may receive, an indication of the failure. For example, as described in connection with FIGS. 7A and 7B, the indication may be included in a UI that shows the failure. Accordingly, the remediation engine may transmit instructions for the UI, and the user device may show or otherwise output the UI, based on the instructions, for the user of the user device (e.g., via a display, a speaker, or another type of output component).

Additionally, or alternatively, when a verification fails, the remediation engine may perform mitigations. For example, the remediation engine may update the data structure to indicate a backup user based on a corresponding user not being included on the list of valid users. As described above, the backup user may include a supervisor associated with the user. For example, the remediation engine may determine the supervisor from a database storing an organization chart or another similar type of data structure. The database may be implemented in a local storage (e.g., a memory managed by the remediation engine) or in a storage that is at least partially separate (e.g., physically, logically, and/or virtually) from the remediation engine. Therefore, the remediation engine may transmit a query to the database (e.g., included in an HTTP request and/or using an API call) and receive a response to the query (e.g., included in an HTTP response and/or as a return from the API call) that includes the supervisor.

Additionally, or alternatively, the backup user may already be indicated in the data structure. For example, the user device may indicate the backup user when indicating the corresponding user, as described in connection with reference number 115. Accordingly, the remediation engine may modify the data structure to associate the backup user with the cloud-based application and remove the corresponding user from the data structure.

Although the example 100 is described in connection with the data structure being verified after creation (and updating), other examples may include the data structure being verified at a later time. For example, the remediation engine may verify the data structure periodically (e.g., based on a default schedule or a schedule indicated by the user device). Additionally, or alternatively, although the example 100 is described in connection with the remediation engine verifying the data structure, other examples may include a separate device receiving the data structure (e.g., from the remediation engine), verifying the data structure, and transmitting an indication of an outcome of the verifying (e.g., to the remediation engine).

The remediation engine may provide the data structure for processing alerts associated with the cloud-based application. The remediation engine may provide the data structure in response to generating (and verifying) the data structure. In some implementations, as shown by reference number 135, the remediation engine may provide the data structure by storing the data structure in a memory. The memory may be accessible to a device processing the alerts, whether the remediation engine or a device that is at least partially separate (e.g., physically, logically, and/or virtually) from the remediation engine. Accordingly, the memory may be local (with access governed by the remediation engine) or at least partially separate (e.g., physically, logically, and/or virtually) from the remediation engine.

Additionally, or alternatively, the remediation engine may provide the data structure by provisioning an API endpoint that permits access to the data structure. The API endpoint may include an Internet protocol (IP) address, a medium access control (MAC) address, or another alphanumeric identifier of the API. The API may be accessible to a device processing the alerts, whether the remediation engine or a device that is at least partially separate (e.g., physically, logically, and/or virtually) from the remediation engine.

Although the example 100 is described in connection with the user device providing indications via one or more UIs, other examples may include the user device transmitting, and the remediation engine receiving, a file associated with a plurality of cloud-based applications. For example, as described in connection with FIG. 5B, the user device may upload the file to the remediation engine. Therefore, the remediation device may determine users, categories, and labels from the file rather than receiving the users, categories, and labels via UIs. Accordingly, the remediation device may generate (and provide) a plurality of data structures for the plurality of cloud-based applications based on the file.

By using techniques as described in connection with FIGS. 1A-1C, the user of the user device (e.g., the administrator) can quickly and easily create data structures, using UIs and/or a file upload, to govern communications regarding cloud-based applications. Additionally, the remediation engine performs automated verification of (and mitigation for) the data structures in order to ensure that team names and users are valid and active. Because the data structures may be used to transmit communications regarding the cloud-based applications, as described in connection with FIGS. 3A-3B, power, processing resources, and network resources are conserved that otherwise would have been wasted in transmitting the communications to invalid teams and/or inactive users.

As indicated above, FIGS. 1A-1C are provided as an example. Other examples may differ from what is described with regard to FIGS. 1A-1C.

Figure 2A:
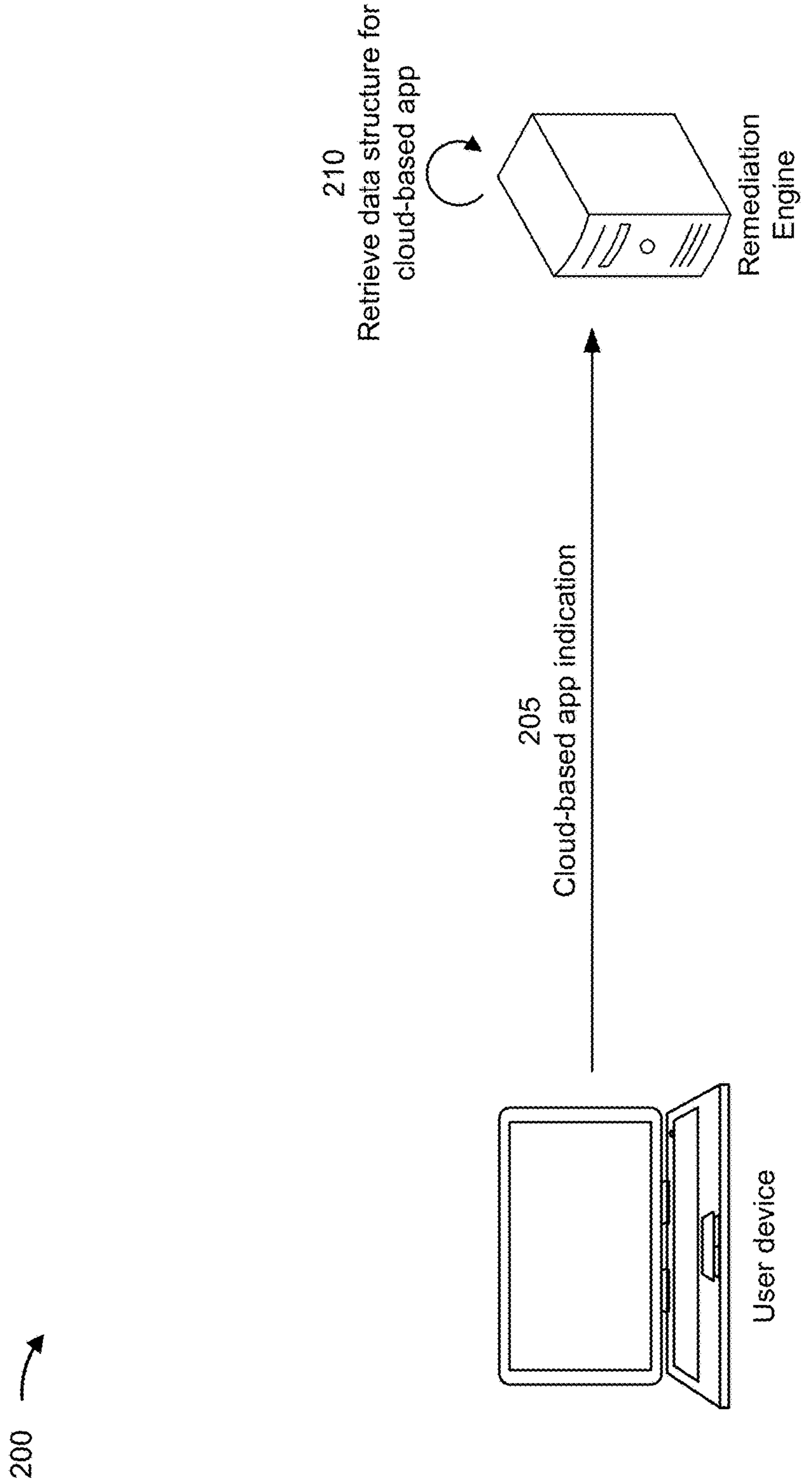
FIGS. 2A-2C are diagrams of an example implementation relating to updating data structures for cloud-based applications, in accordance with some embodiments of the present disclosure.
Figure 2B:
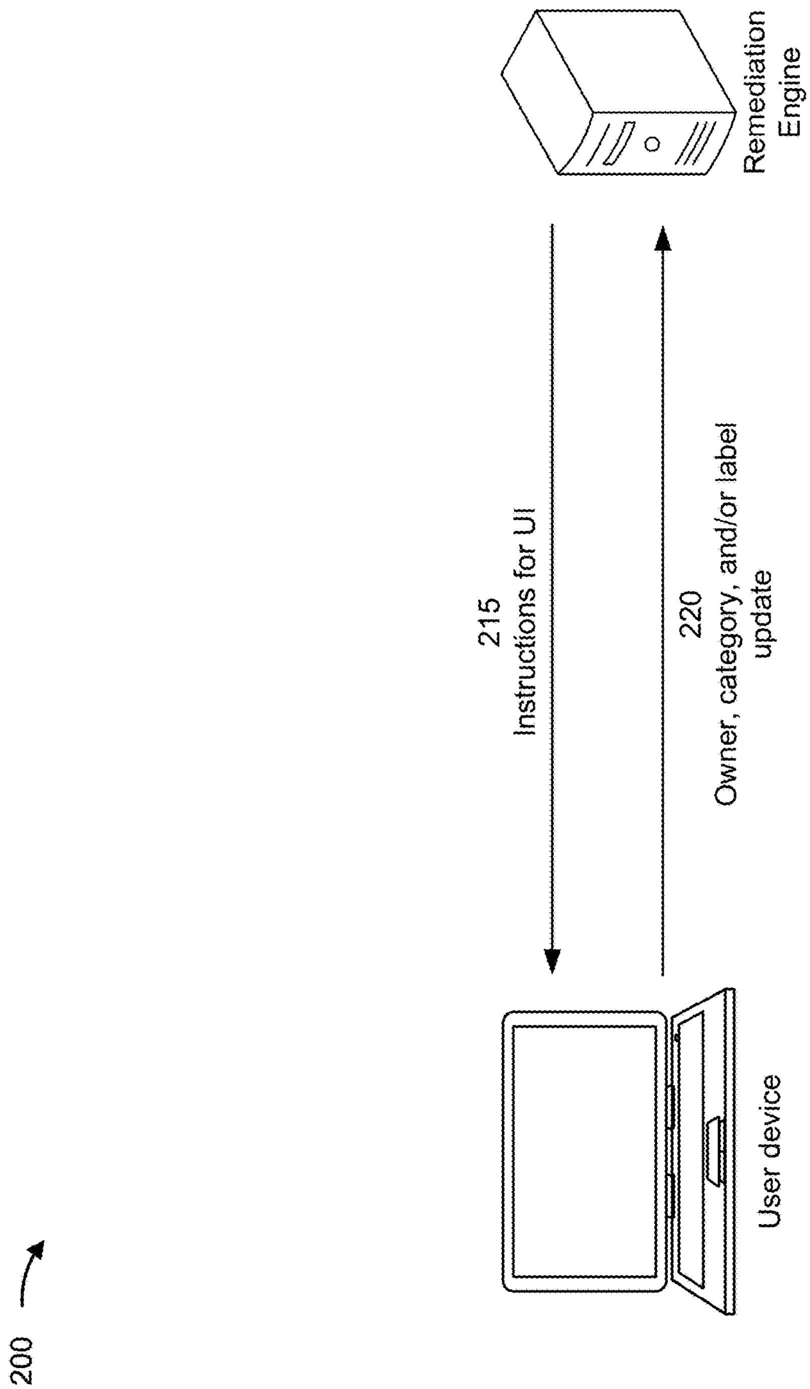
Figure 2C:
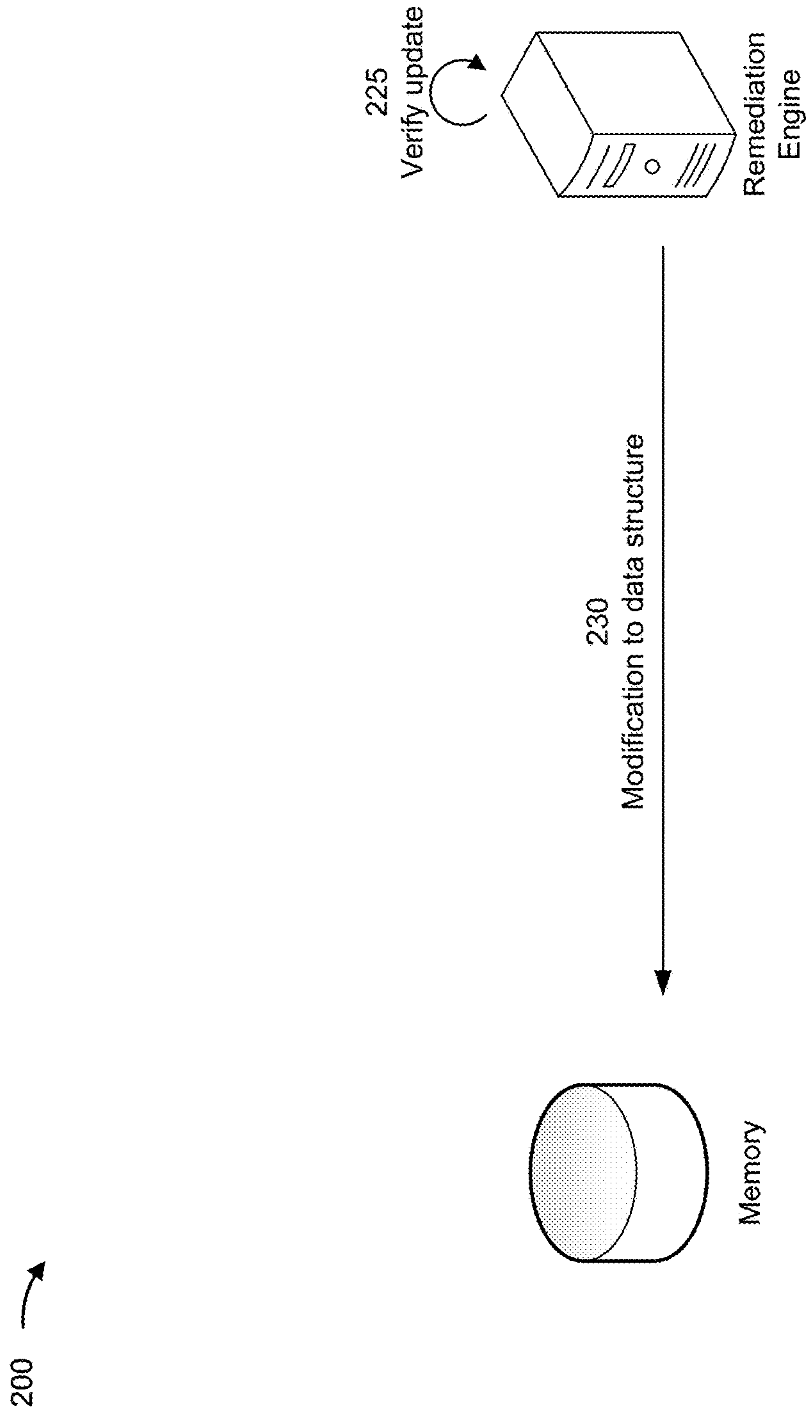

FIGS. 2A-2C are diagrams of an example 200 associated with updating data structures for cloud-based applications. As shown in FIGS. 2A-2C, example 200 includes a user device and a remediation engine. These devices are described in more detail in connection with FIGS. 8 and 9.

As shown in FIG. 2A and by reference number 205, the user device may transmit, and the remediation engine may receive, an indication of a cloud-based application. For example, the indication may include an identifier (e.g., an alphanumeric identifier) associated with the cloud-based application. The indication may be included in an HTTP message and/or as an argument of an API call, among other examples.

In some implementations, a user of the user device (e.g., an administrator associated with the cloud-based application) may interact with a UI (e.g., via a keyboard, a mouse, a touchscreen, or another type of input component) and trigger the user device to transmit the indication. For example, the UI may be as described in connection with FIG. 5C or FIG. 6A. Accordingly, the remediation engine may transmit instructions for the UI to the user device, and the user device may transmit the indication after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication after showing the website to the user and in response to the user interacting with the website.

As shown by reference number 210, the remediation engine may retrieve a data structure for the cloud-based application. As described in connection with FIG. 4, the data structure may include a tree structure. For example, teams of users may represent branches that are connected to a common trunk (or root) representing the cloud-based application. Other relational structures may include a graph or another structured data type.

The remediation engine may receive the data structure from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the data structure. The data structure may have been previously stored after being generated as described in connection with FIGS. 1A-1C.

As shown in FIG. 2B and by reference number 215, the remediation engine may transmit, and the user device may receive, instructions for a UI to allow modification to the data structure. The remediation engine may transmit the instructions in response to the indication of the cloud-based application. The UI may be as described in connection with FIG. 5A or FIG. 6A. In some implementations, the user may indicate the cloud-based application using one element of the UI such that the remediation engine populates other elements of the UI based on the data structure.

Although the example 200 is described in connection with indicating the cloud-based application, the user device may alternatively indicate a team. Accordingly, the remediation engine may transmit the instructions for the UI in response to the indication of the team. The UI may be as described in connection with FIG. 6B. In some implementations, the user may indicate the team using one element of the UI such that the remediation engine populates other elements of the UI based on the data structure.

As shown by reference number 220, the user device may transmit, and the remediation engine may receive, an update including an indication of a new corresponding user (such as an owner), a new category, and/or one or more new labels for the cloud-based application. For example, the indication may include an identifier (e.g., a username associated with a communication service, such as Slack® or Microsoft Teams®, a username associated with an organization managing the cloud-based application, and/or an email address, among other examples) associated with the corresponding user, a string associated with a story or an epic (e.g., as used in Jira® or another type of issue tracking software) associated with the cloud-based application, and/or strings, representing the labels, associated with the cloud-based application. The indication may be included in an HTTP message and/or as an argument of an API call, among other examples.

In some implementations, the user of the user device (e.g., the administrator associated with the cloud-based application) may interact with a UI (e.g., via a keyboard, a mouse, a touchscreen, or another type of input component) and trigger the user device to transmit the indication. For example, the UI may be as described in connection with FIG. 6B. Accordingly, the remediation engine may transmit instructions for the UI to the user device, and the user device may transmit the indication after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication after showing the website to the user and in response to the user interacting with the website.

In some implementations, the user device may transmit an indication of multiple users (or multiple indications of multiple users). For example, as described in connection with FIG. 6B, the user device may indicate an additional user to receive communications associated with the cloud-based application in addition to the corresponding user (e.g., the owner). In another example, the user device may indicate a supervisor of the corresponding user or another type of backup user. Accordingly, the remediation engine may use the backup user as described in connection with reference number 225.

The new category may be associated with the cloud-based application in general. Additionally, or alternatively, the user device may transmit an indication of multiple categories (or multiple indications of multiple categories), such that different modules of the cloud-based application are associated with different categories. For example, one module of the cloud-based application may be associated with a corresponding cloud-based storage supporting the application, another module of the cloud-based application may be associated with a data set used by the cloud-based application, and yet another module of the cloud-based application may be associated with an API managed by the cloud-based application, among other examples. Accordingly, the user device may indicate a category for each module in addition to, or in lieu of, a global category associated with the cloud-based application in general.

Similarly, the new labels may be associated with the cloud-based application in general. Additionally, or alternatively, the user device may transmit an indication of multiple labels (or multiple indications of multiple labels), such that different modules of the cloud-based application are associated with different labels.

As shown in FIG. 2C and by reference number 225, the remediation engine may perform verifications on the update from the user device. For example, the remediation engine may verify whether a team name, indicated in the update, is included on a list of valid team names. The remediation engine may access the list of valid team names from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the list of valid team names.

Additionally, or alternatively, the remediation engine may verify whether a user, indicated in the update, is included on a list of valid users. The remediation engine may access the list of valid users from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the list of valid users. The storage with the valid users may be the same storage that has the list of valid team names or may be a different storage.

In some implementations, when a verification fails, the remediation engine may transmit, and the user device may receive, an indication of the failure. For example, as described in connection with FIGS. 7A and 7B, the indication may be included in a UI that shows the failure. Accordingly, the remediation engine may transmit instructions for the UI, and the user device may show or otherwise output the UI, based on the instructions, for the user of the user device (e.g., via a display, a speaker, or another type of output component).

Additionally, or alternatively, when a verification fails, the remediation engine may perform mitigations. For example, the remediation engine may update the data structure to indicate a backup user based on the new corresponding user not being included on the list of valid users. For example, the remediation engine may determine the supervisor from a database storing an organization chart or another similar type of data structure. The database may be implemented in a local storage (e.g., a memory managed by the remediation engine) or in a storage that is at least partially separate (e.g., physically, logically, and/or virtually) from the remediation engine. Therefore, the remediation engine may transmit a query to the database (e.g., included in an HTTP request and/or using an API call) and receive a response to the query (e.g., included in an HTTP response and/or as a return from the API call) that includes the supervisor. Additionally, or alternatively, the backup user may already be indicated in the data structure or the update. Accordingly, the remediation engine may modify the data structure to associate the backup user with the cloud-based application rather than the new corresponding user.

Although the example 200 is described in connection with the data structure being verified after the update, other examples may include the data structure being verified at a later time. For example, the remediation engine may verify the data structure periodically (e.g., based on a default schedule or a schedule indicated by the user device). Additionally, or alternatively, although the example 200 is described in connection with the remediation engine verifying the data structure, other examples may include a separate device receiving the data structure (e.g., from the remediation engine), verifying the data structure, and transmitting an indication of an outcome of the verifying (e.g., to the remediation engine).

The remediation engine may modify the data structure based on the update. In some implementations, as shown by reference number 230, the remediation engine may update the data structure by transmitting a modification to a memory storing the data structure. Additionally, or alternatively, the remediation engine may update the data structure by modifying an API endpoint that permits access to the data structure. For example, the remediation engine may store an updated version of the data structure and modify the API endpoint to be associated with the updated version of the data structure rather than a previous version.

Although the example 200 is described in connection with the user device providing indications via one or more UIs, other examples may include the user device transmitting, and the remediation engine receiving, a file associated with a plurality of cloud-based applications. For example, as described in connection with FIG. 5B, the user device may upload the file to the remediation engine. Therefore, the remediation device may determine new users, new categories, and new labels from the file rather than receiving the new users, new categories, and new labels via UIs. Accordingly, the remediation device may update a plurality of data structures for the plurality of cloud-based applications based on the file.

By using techniques as described in connection with FIGS. 2A-2C, the user of the user device (e.g., the administrator) can quickly and easily update data structures, using UIs and/or a file upload, to govern communications regarding cloud-based applications. Additionally, the remediation engine performs automated verification of (and mitigation for) the update in order to ensure team names and users are valid and active. Because the data structures may be used to transmit communications regarding the cloud-based applications, as described in connection with FIGS. 3A-3B, power, processing resources, and network resources are conserved that otherwise would have been wasted in transmitting the communications to invalid teams and/or inactive users.

As indicated above, FIGS. 2A-2C are provided as an example. Other examples may differ from what is described with regard to FIGS. 2A-2C.

Figure 3A:
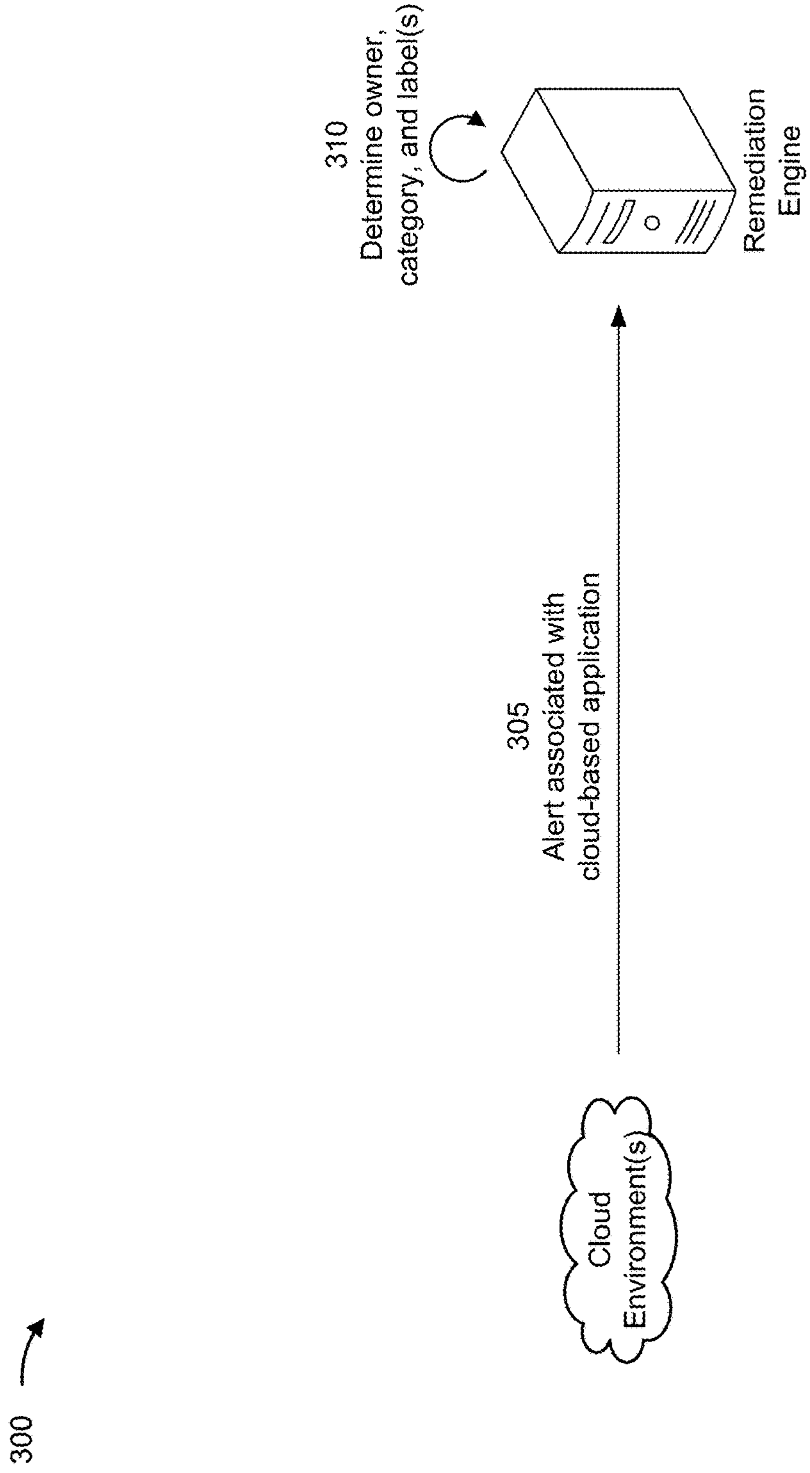
FIGS. 3A-3B are diagrams of an example implementation relating to generating and assigning tickets for cloud-based applications, in accordance with some embodiments of the present disclosure.
Figure 3B:
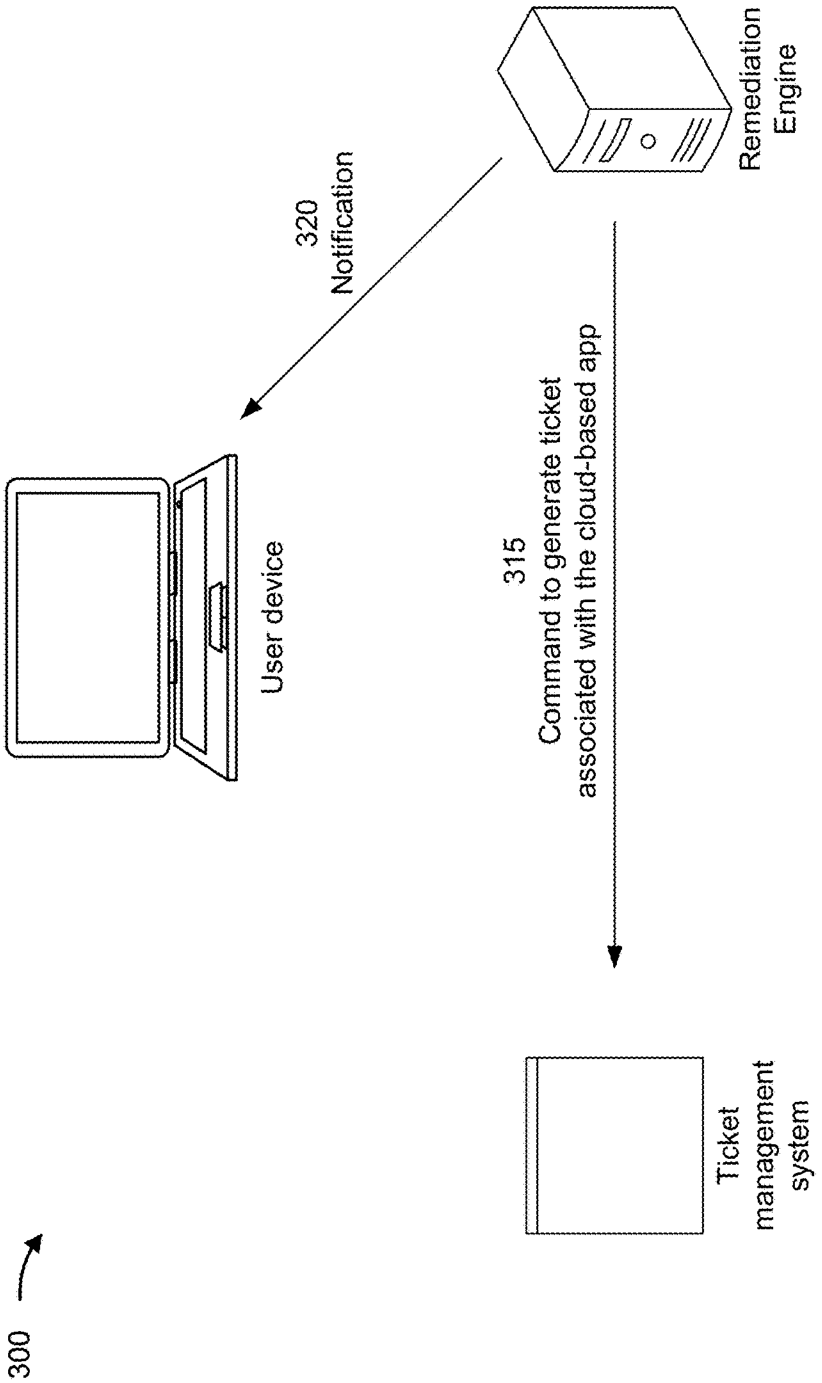

FIGS. 3A-3B are diagrams of an example 300 associated with generating and assigning tickets for cloud-based applications. As shown in FIGS. 3A-3B, example 300 includes one or more cloud environments, a user device, a remediation engine, and a ticket management system. These devices are described in more detail in connection with FIGS. 8 and 9.

As shown in FIG. 3A and by reference number 305, the cloud environment(s) may transmit, and the remediation engine may receive, an indication of an alert associated with a cloud-based application. The alert may be associated with a security vulnerability experienced by the cloud-based application. In some implementations, the remediation engine may transmit, and the cloud environment(s) may receive, a request for information. For example, the request may include an HTTP request and/or an API call, among other examples. The request may include (e.g., in a header and/or as an argument) an indication of the cloud-based application associated with the alert. Accordingly, the cloud environment(s) may transmit the indication in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to information updates from the cloud environment(s). Accordingly, the cloud environment(s) may transmit the information according to a schedule (e.g., once per hour or once per day, among other examples) and/or as available (e.g., shortly after a change to the cloud-based application is detected).

Although the example 100 is described with the remediation engine receiving the indication of the alert from the cloud environment(s), other examples may additionally or alternatively include the remediation engine receiving information, associated with the alert, from one or more cloud databases. For example, the cloud database(s) may transmit, and the remediation engine may receive, information associated with the cloud-based application that indicates a security vulnerability. The cloud database(s) may store information regarding security vulnerabilities. In some implementations, the cloud database(s) may include an on-site database and/or a remote database storing the information. In some implementations, the cloud database(s) may be relational, such that security vulnerability indications are stored in association (e.g., via rows and/or columns) with identifiers of cloud-based applications. As another example, the cloud database(s) may be graphical, such that nodes representing cloud-based applications are connected (e.g., via edges) to nodes representing security vulnerability indications. In some implementations, the cloud database(s) may receive the information automatically (e.g., as output from one or more ASVs) and/or manually (e.g., entered by one or more administrators associated with the cloud-based applications). In some implementations, the security vulnerability indications may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with cloud-based applications.

As shown by reference number 310, the remediation engine may determine, using a data structure mapping (i.e., that maps) application identifiers to user identifiers, a corresponding user associated with the cloud-based application. For example, the remediation engine may map a string representing the cloud-based application (e.g., a name of the application) to a string representing the corresponding user (e.g., a name of the user, a username, and/or an email address, among other examples).

The remediation engine may receive the data structure from a local storage (e.g., a memory managed by the remediation engine) or from a storage that is at least partially separate (e.g., physically, logically, and/or virtually) from the remediation engine. Therefore, the remediation engine may transmit a query to the storage (e.g., included in an HTTP request and/or using an API call) and receive a response to the query (e.g., included in an HTTP response and/or as a return from the API call) that includes the data structure. The data structure may have been previously stored after being generated as described in connection with FIGS. 1A-1C.

As further shown by reference number 310, the remediation engine may determine, using the data structure, a corresponding category associated with the cloud-based application and/or a corresponding label associated with the alert. For example, the data structure may map application identifiers to categories such that the remediation engine determines the corresponding category for the cloud-based application (e.g., by mapping a string representing the cloud-based application to a string representing the corresponding category). Similarly, the data structure may map application identifiers to labels such that the remediation engine determines the corresponding label for the cloud-based application (e.g., by mapping a string representing the cloud-based application to a string representing the corresponding label). Although the example 300 includes the label being associated with the cloud-based application, other examples may include the label being associated with a module of the cloud-based application and/or a type of the alert (e.g., whether the alert is for a rehydration procedure or a software update, among other examples). Additionally, or alternatively, although the example 300 includes the category being associated with the cloud-based application, other examples may include the category being associated with a module of the cloud-based application and/or a type of the alert (e.g., whether the alert is for a rehydration procedure or a software update, among other examples). Therefore, the remediation engine may determine the module and/or the type of the alert from the indication of the alert (e.g., by extracting information from a header and/or fields of the indication).

In some implementations, the remediation engine may determine, using the data structure, a corresponding project key associated with the cloud-based application. For example, the data structure may map application identifiers to project keys such that the remediation engine determines the corresponding project key for the cloud-based application (e.g., by mapping a string representing the cloud-based application to a string representing the corresponding project key). Although the example 300 includes the project key being associated with the cloud-based application, other examples may include the project key being associated with a module of the cloud-based application and/or a type of the alert (e.g., whether the alert is for a rehydration procedure or a software update, among other examples).

As shown in FIG. 3B and by reference number 315, the remediation engine may transmit, and the ticket management system may receive, a command to generate a ticket associated with the cloud-based application. The ticket may be associated with the alert (e.g., indicating the security vulnerability associated with the alert). The remediation engine may include the corresponding label and the corresponding category in the command such that the ticket indicates a correct label and category. Additionally, the remediation engine may indicate the corresponding user in the command such that the ticket tags the corresponding user. In some implementations, the remediation engine may include the corresponding project key in the command such that the ticket indicates a correct project key.

In some implementations, the remediation engine may include an email address, associated with the corresponding user, in the command. Accordingly, the ticket management system may transmit communications, associated with the ticket, to the email address. The email address may be indicated in the data structure. Alternatively, the remediation engine may determine the email address from a database storing a contact list or another similar type of data structure. The database may be implemented in a local storage (e.g., a memory managed by the remediation engine) or in a storage that is at least partially separate (e.g., physically, logically, and/or virtually) from the remediation engine. Therefore, the remediation engine may transmit a query to the database (e.g., included in an HTTP request and/or using an API call) and receive a response to the query (e.g., included in an HTTP response and/or as a return from the API call) that includes the email address.

In some implementations, as shown by reference number 320, the remediation engine may additionally transmit, and the user device may receive, a notification associated with the alert. For example, the notification may indicate the alert and the cloud-based application. The notification may be transmitted based on the corresponding user associated with the cloud-based application. For example, the notification may be transmitted using an email address associated with the corresponding user (e.g., determined as described above).

In some implementations, the notification may be based on a communication setting associated with the corresponding user. For example, an identifier of the corresponding user may be stored in association with a Boolean (or another type of value) indicating whether the corresponding user should be notified of alerts associated with the cloud-based application.

By using techniques as described in connection with FIGS. 3A-3B, tickets and communications for cloud-based applications are determined based on data structures associated with the cloud-based applications, which improves user experience and renders the users more likely to perform remediation because the users only receive communications for cloud-based applications that they own or otherwise manage. As a result, power, processing resources, and network resources are conserved that otherwise would have been wasted in generating tickets assigned to incorrect users and/or transmitting communications to unnecessary users.

As indicated above, FIGS. 3A-3B are provided as an example. Other examples may differ from what is described with regard to FIGS. 3A-3B.

Figure 4:
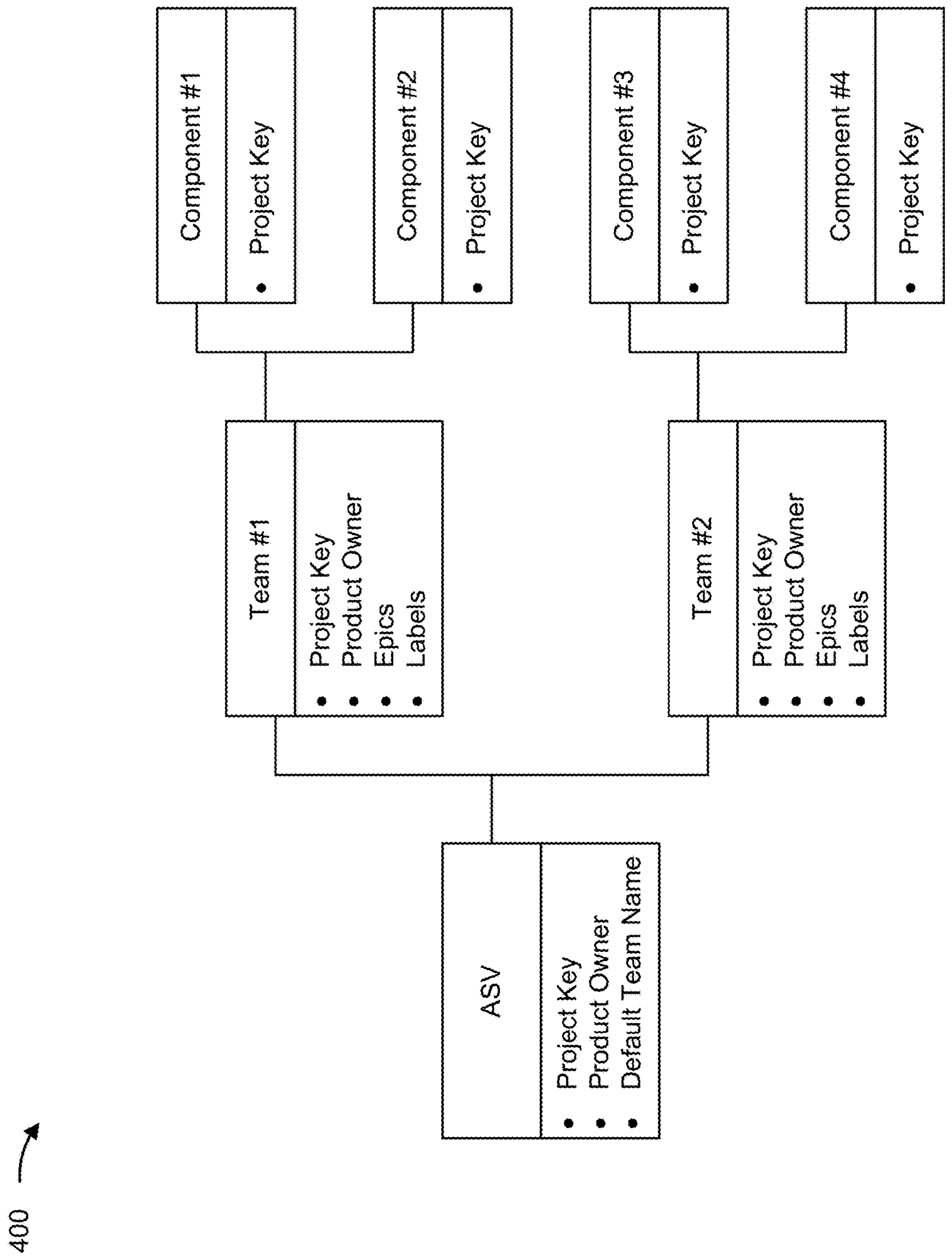
FIG. 4 is a diagram of an example data structure associated with a cloud-based application, in accordance with some embodiments of the present disclosure.

FIG. 4 is a diagram of an example data structure 400 associated with a cloud-based application. The example data structure 400 may be used by a remediation engine (e.g., to generate commands for a ticket management system). These devices are described in more detail in connection with FIGS. 8 and 9.

As shown in FIG. 4, a root of the data structure may indicate a cloud-based application (shown as "ASV" in FIG. 4). The root may be associated with a default project key, a default user (shown as "Product Owner" in FIG. 4), and a default team (e.g., associated with the default user). Accordingly, the remediation engine may use the default project key, the default user, and the default team when generating a ticket for the cloud-based application that is not associated with specific modules of the cloud-based application (shown as "Component #1," "Component #2," "Component #3," and "Component #4" and described in more detail below).

As further shown in FIG. 4, branches of the data structure may indicate teams (shown as "Team #1" and "Team #2" in FIG. 4) associated with the cloud-based application. Each team may be associated with a project key, a corresponding user (shown as "Product Owner" in FIG. 4), one or more categories (e.g., shown as "Epics" in FIG. 4), and one or more labels. Each team is further associated with different modules of the cloud-based application (shown as "Component #1," "Component #2," "Component #3," and "Component #4" in FIG. 4). Therefore, the remediation engine may use the project key, the user, at least one of the categories, and at least one of the labels, from Team #1, when generating a ticket for Component #1 or Component #2 of the cloud-based application. Similarly, the remediation engine may use the project key, the user, at least one of the categories, and at least one of the labels, from Team #2, when generating a ticket for Component #3 or Component #4 of the cloud-based application. As further shown in FIG. 4, nodes of the data structure indicating the modules may indicate which project keys to use for which modules. Additionally, or alternatively, nodes of the data structure indicating the modules may indicate which categories and/or labels to use for which modules.

By using techniques as described in connection with FIG. 4, the remediation engine generates tickets for the cloud-based application based on the data structure associated with the cloud-based application. As a result, power, processing resources, and network resources are conserved that otherwise would have been wasted in generating tickets that tag incorrect users, indicate incorrect categories, include incorrect labels, and/or include incorrect project keys.

As indicated above, FIG. 4 is provided as an example. Other examples may differ from what is described with regard to FIG. 4. For example, in some implementations, a graph structure may be used other than a tree structure.

Figure 5A:
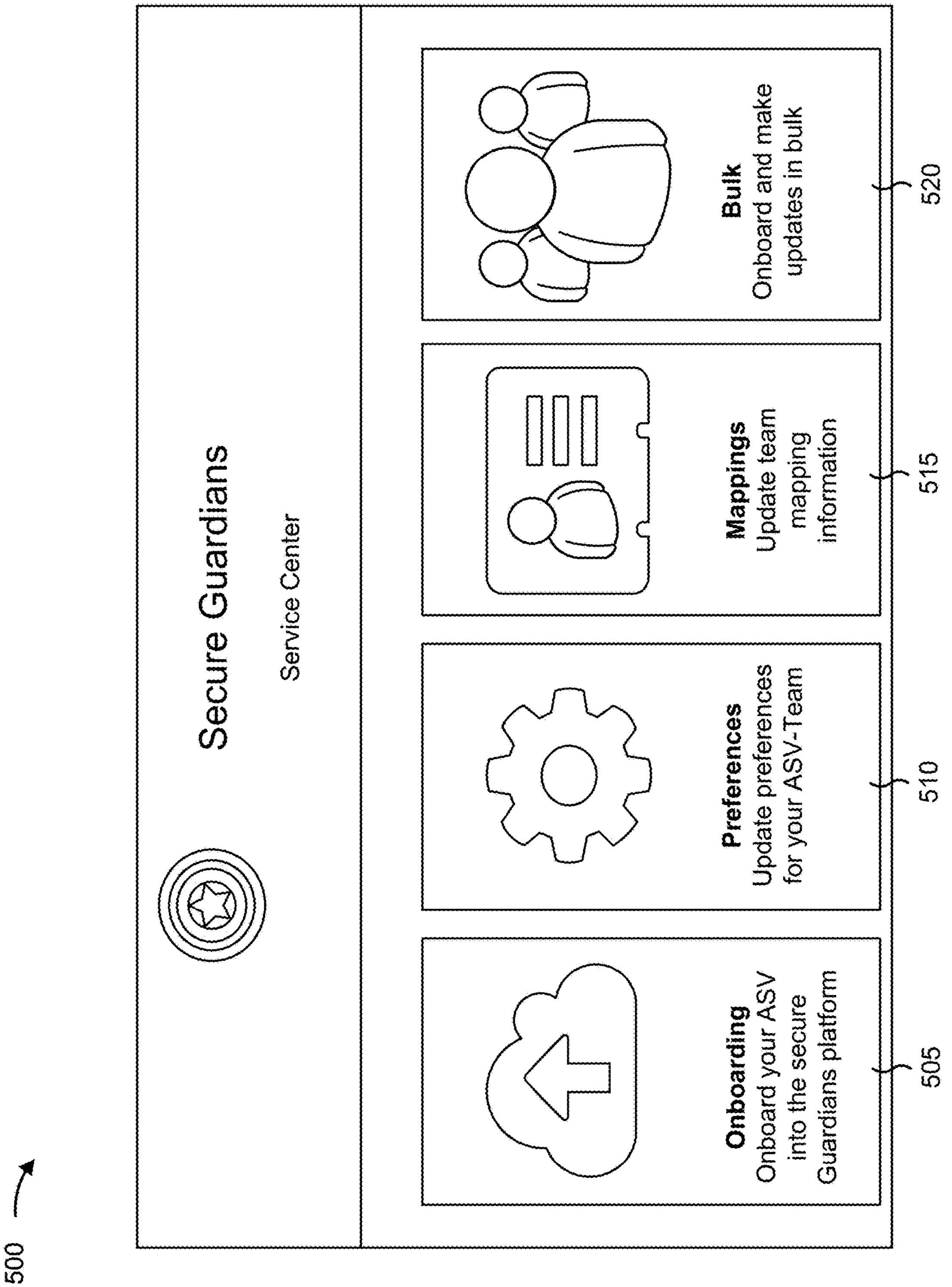
FIGS. 5A-5C are diagrams of example user interfaces (UIs) associated with providing information for a cloud-based application, in accordance with some embodiments of the present disclosure.
Figure 5B:
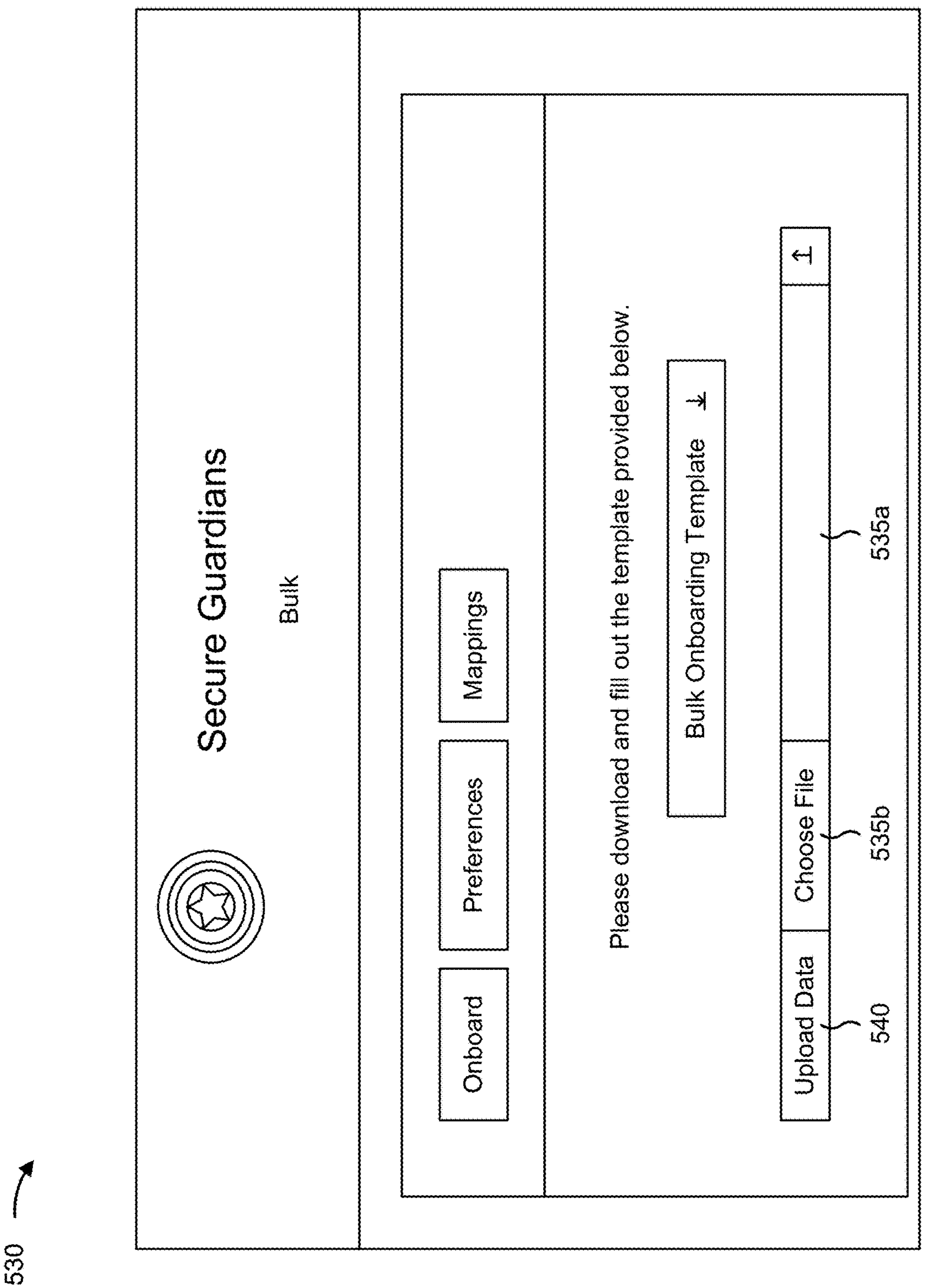
Figure 5C:
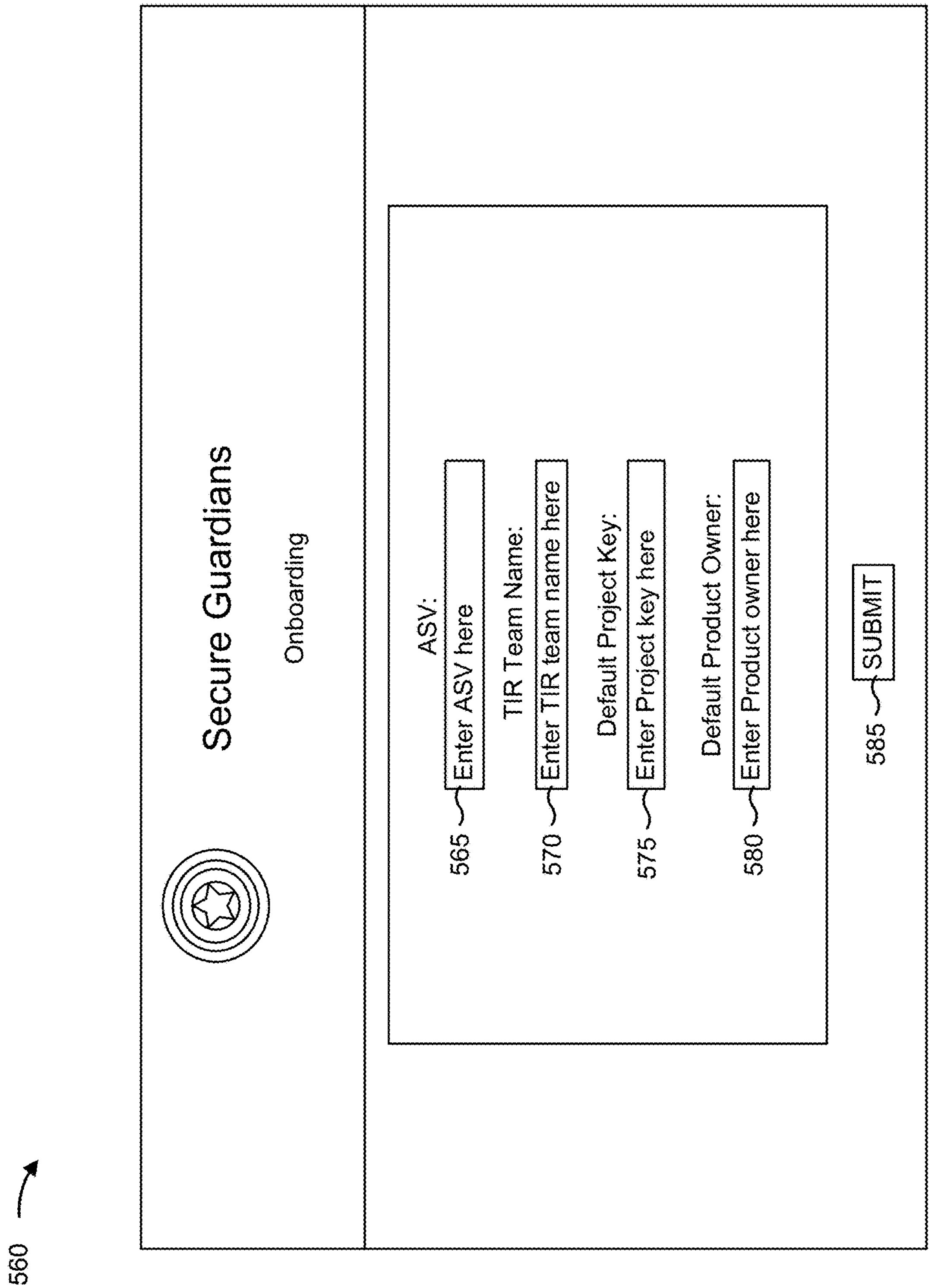

FIGS. 5A, 5B, and 5C are diagrams of example UIs 500, 530, and 560, respectively, associated with providing information for a cloud-based application. The example UIs 500, 530, and 560 may be shown by a user device (e.g., based on instructions from a remediation engine). These devices are described in more detail in connection with FIGS. 8 and 9.

As shown in FIG. 5A, a first element 505 (e.g., a button or another type of UI element) may trigger creation of a new data structure for a cloud-based application (e.g., as described in connection with FIGS. 1A-1C). A second element 510 and a third element 515 (e.g., a button or another type of UI element) may trigger updates to a data structure for an existing cloud-based application (e.g., as described in connection with FIGS. 2A-2C). For example, the second element 510 may trigger updates to categories and labels, as described in connection with FIG. 6A, while the third element 515 may trigger updates to users and project keys, as described in connection with FIG. 6B. Other examples may include different UIs that manage different combinations of updates to the data structure. A fourth element 520 (e.g., a button or another type of UI element) may trigger creation of new data structures or updates to data structures, for cloud-based applications, based on an uploaded file (e.g., as described in connection with FIG. 1C and FIG. 2C).

As shown in FIG. 5B, a file may be uploaded using a selector (e.g., selector 535*a* and/or selector 535*b*) and a confirmation element 540. Therefore, the remediation engine may generate new data structures based on the file or may update existing data structures based on the file.

As shown in FIG. 5C, a first element 565 (e.g., a text box or another type of UI element) may receive a name (or another identifier) of the cloud-based application (e.g., as described in connection with FIG. 1A). Additionally, a second element 570 (e.g., a text box or another type of UI element) may receive a name (or another identifier) of a team to be associated with the cloud-based application (e.g., as described in connection with FIG. 1B), a third element 575 (e.g., a text box or another type of UI element) may receive a project key to be associated with the cloud-based application (e.g., as described in connection with FIG. 1B), and a fourth element 580 (e.g., a text box or another type of UI element) may receive a name (or another identifier) of a user to be associated with the cloud-based application (e.g., as described in connection with FIG. 1B). As further shown in FIG. 5C, a confirmation element 585 may trigger the remediation engine to generate a new data structure based on the information in the elements 565, 570, 575, and 580 (e.g., as described in connection with FIGS. 1A-1C).

As indicated above, FIGS. 5A-5C are provided as examples. Other examples may differ from what is described with regard to FIGS. 5A-5C.

Figure 6A:
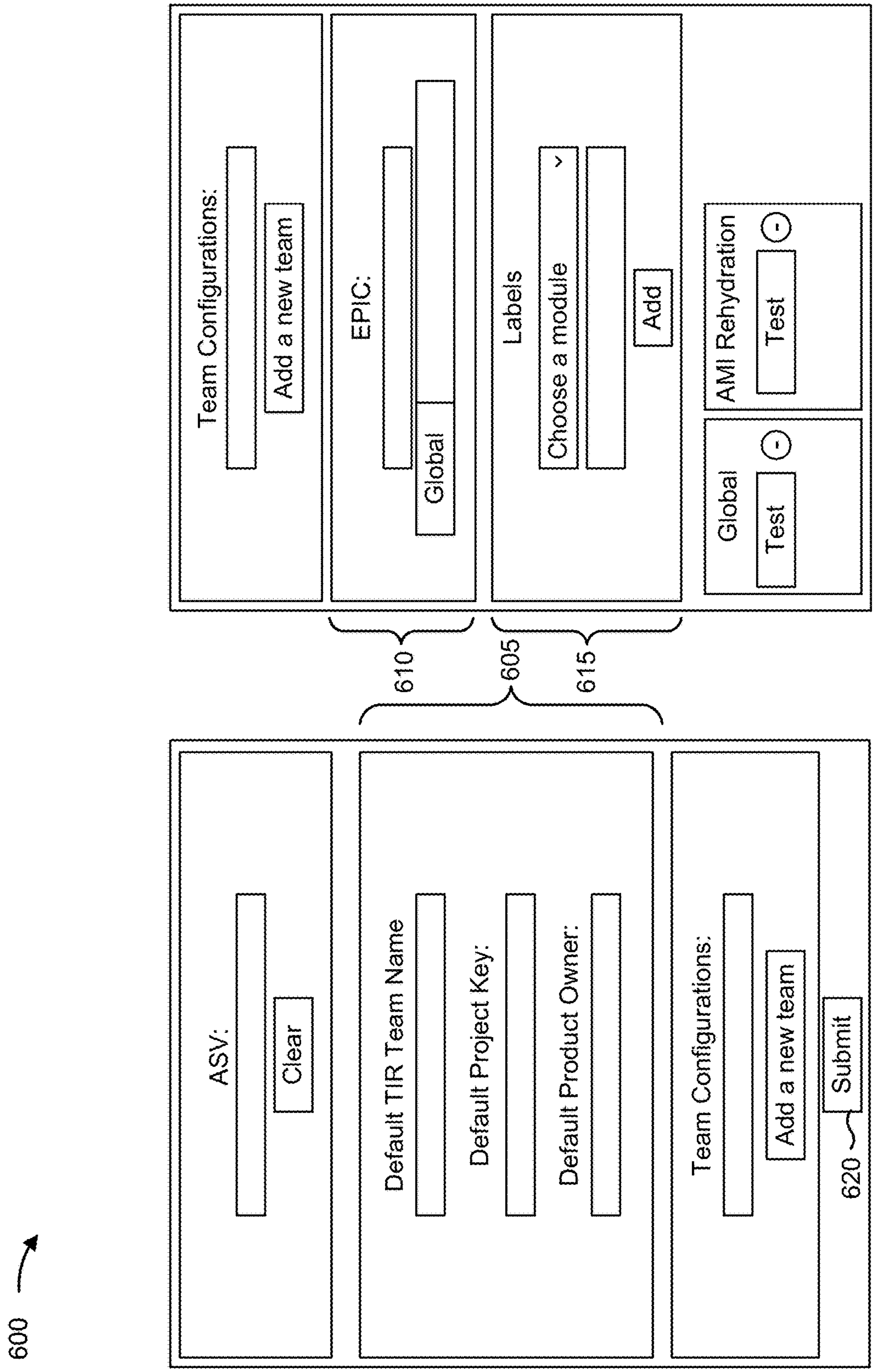
FIGS. 6A-6B are diagrams of example UIs associated with providing information for a cloud-based application, in accordance with some embodiments of the present disclosure.
Figure 6B:
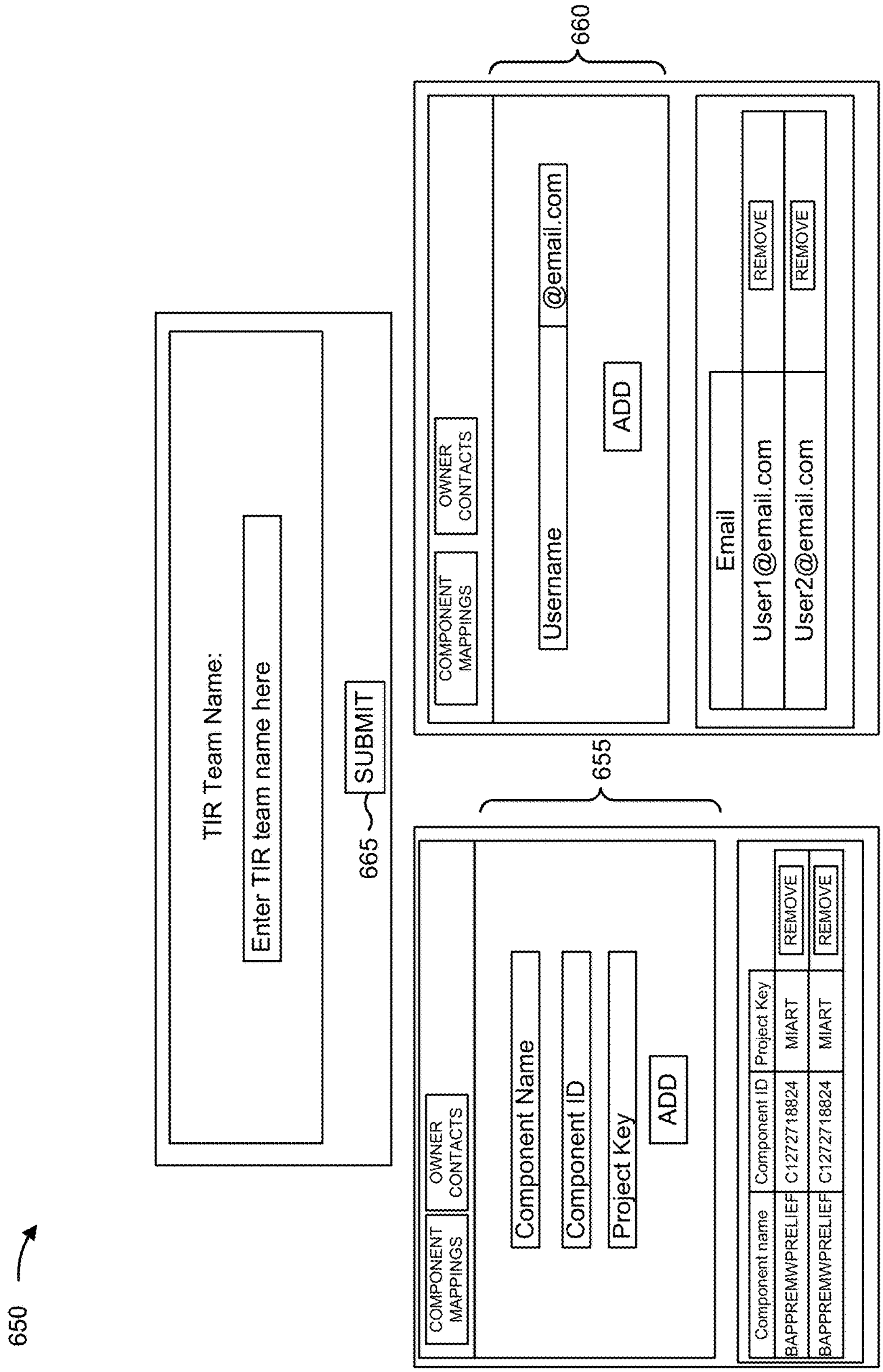

FIGS. 6A and 6B are diagrams of example UIs 600 and 650, respectively, associated with providing information for a cloud-based application. The example UIs 600 and 650 may be shown by a user device (e.g., based on instructions from a remediation engine). These devices are described in more detail in connection with FIGS. 8 and 9.

As shown in FIG. 6A, a first set of elements 605 (e.g., text boxes and/or other types of UI elements) may receive identifiers of a team, a project key, and a user to be associated with the cloud-based application (e.g., as described in connection with FIG. 2B). Additionally, a second set of elements 610 (e.g., text boxes and/or other types of UI elements) may receive categories to be associated with the cloud-based application in general and/or with modules of the cloud-based application. Additionally, a third set of elements 615 (e.g., text boxes and/or other types of UI elements) may receive labels to be associated with the cloud-based application in general and/or with modules of the cloud-based application. As further shown in FIG. 6A, a confirmation element 620 may trigger the remediation engine to update a data structure based on the information in the sets of elements 605, 610, and 615 (e.g., as described in connection with FIGS. 2A-2C).

As shown in FIG. 6B, a first set of elements 655 (e.g., text boxes and/or other types of UI elements) may receive identifiers of project keys to be associated with modules of a cloud-based application (e.g., as described in connection with FIG. 2B). Additionally, a second set of elements 660 (e.g., text boxes and/or other types of UI elements) may receive identifiers of users to be associated with modules of the cloud-based application. As further shown in FIG. 6B, a confirmation element 665 may trigger the remediation engine to update a data structure based on the information in the sets of elements 655 and 660 (e.g., as described in connection with FIGS. 2A-2C).

As indicated above, FIGS. 6A-6B are provided as examples. Other examples may differ from what is described with regard to FIGS. 6A-6B.

Figure 7A:
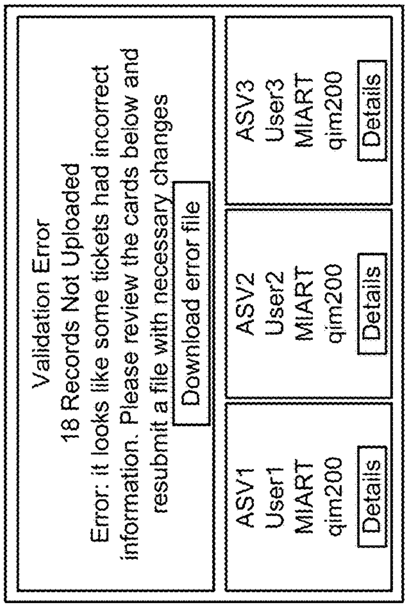
FIGS. 7A-7B are diagrams of example UIs associated with verification of a data structure for a cloud-based application, in accordance with some embodiments of the present disclosure.
Figure 7B:
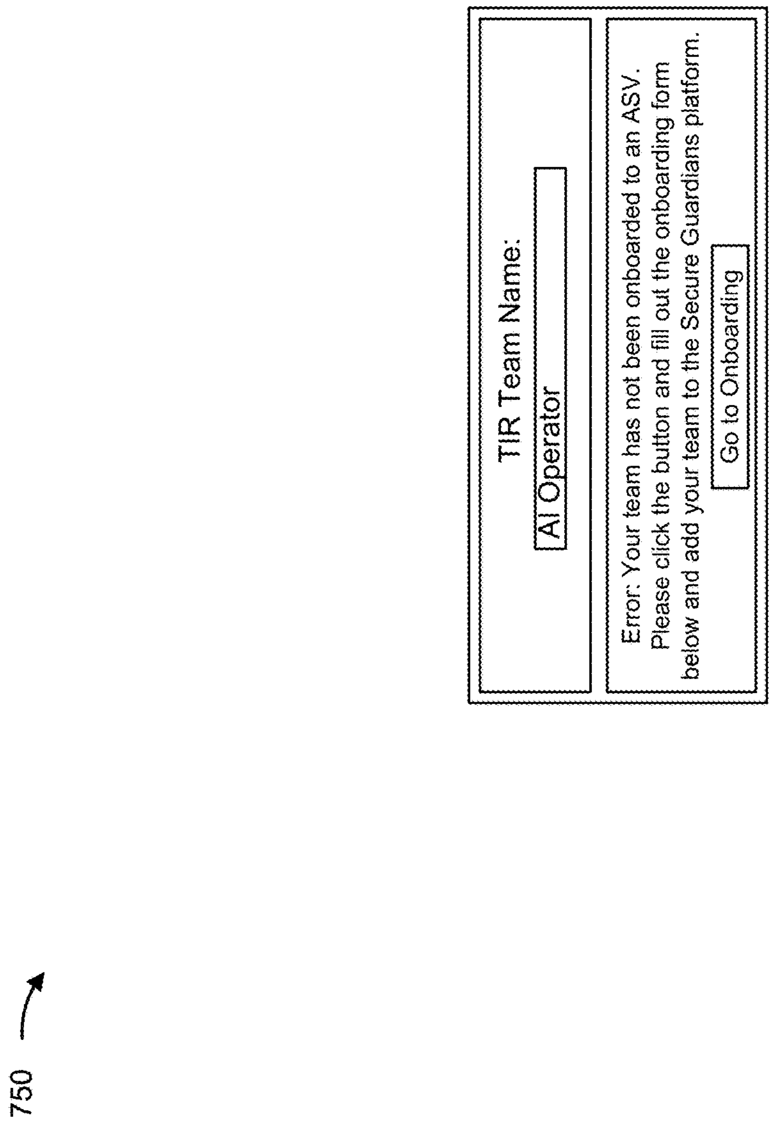

FIGS. 7A and 7B are diagrams of example UIs 700 and 750, respectively, associated with verification of a data structure for a cloud-based application. The example UIs 700 and 750 may be shown by a user device (e.g., based on instructions from a remediation engine). These devices are described in more detail in connection with FIGS. 8 and 9.

As shown in FIG. 7A, the remediation engine may indicate errors associated with a file uploaded for generating new data structures or updating existing data structures. In FIG. 7A, multiple users (e.g., "User1," "User2," and "User3") may be inactive users or otherwise incorrectly assigned to the cloud-based applications (shown as "ASV1," "ASV2," and "ASV3" in FIG. 7A). FIG. 7B is similar to FIG. 7A but shows that a team name ("AI Operator" in FIG. 7B) is not a valid team name. Accordingly, the remediation engine conserves power, processing resources, and network resources that would have been wasted in sending communications to inactive users and/or generating tickets assigned to invalid teams and/or inactive users.

As indicated above, FIGS. 7A-7B are provided as examples. Other examples may differ from what is described with regard to FIGS. 7A-7B.

Figure 8:
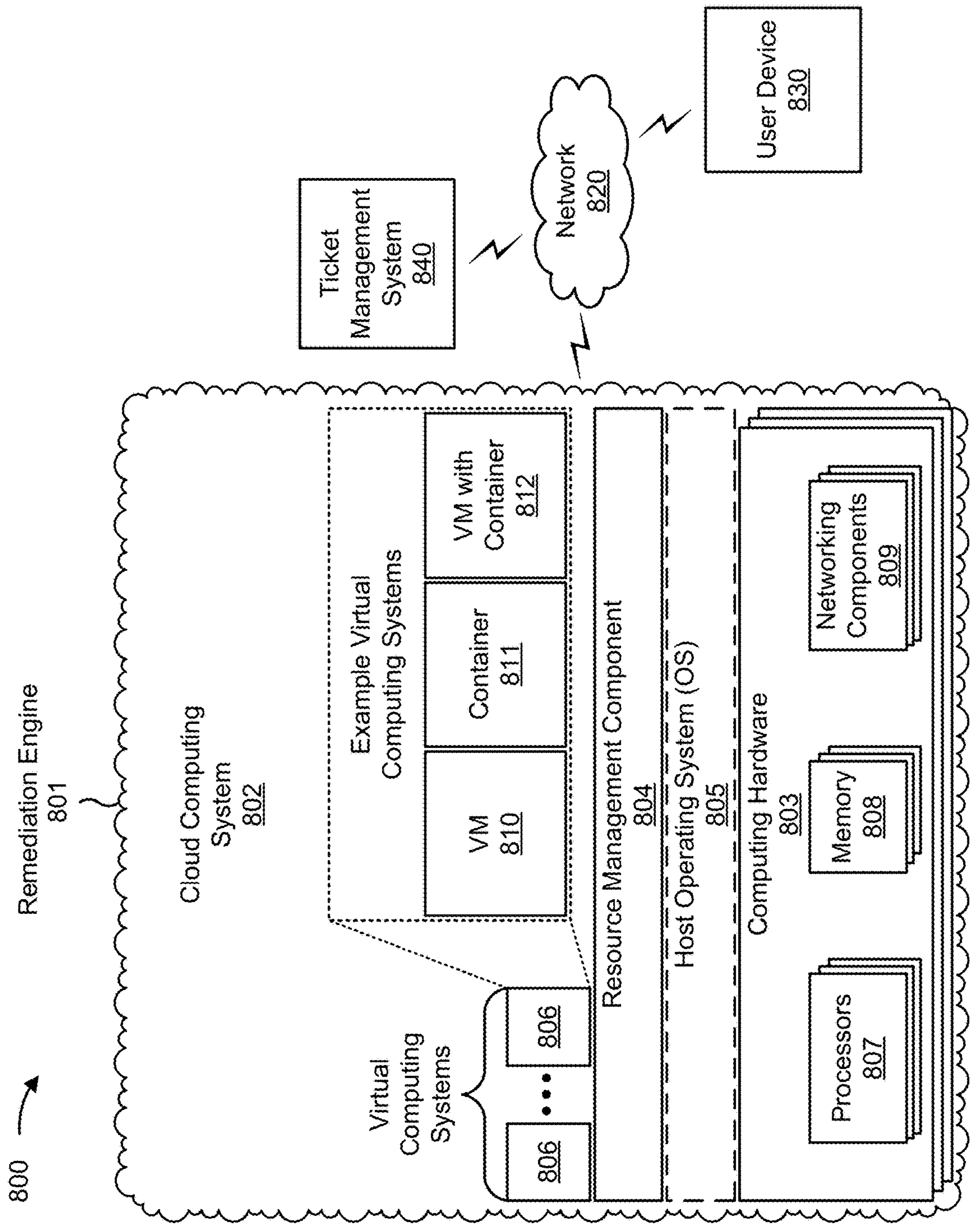
FIG. 8 is a diagram of an example environment in which systems and/or methods described herein may be implemented, in accordance with some embodiments of the present disclosure.

FIG. 8 is a diagram of an example environment 800 in which systems and/or methods described herein may be implemented. As shown in FIG. 8, environment 800 may include a remediation engine 801, which may include one or more elements of and/or may execute within a cloud computing system 802. The cloud computing system 802 may include one or more elements 803-812, as described in more detail below. As further shown in FIG. 8, environment 800 may include a network 820, a user device 830, and/or a ticket management system 840. Devices and/or elements of environment 800 may interconnect via wired connections and/or wireless connections.

The cloud computing system 802 may include computing hardware 803, a resource management component 804, a host operating system (OS) 805, and/or one or more virtual computing systems 806. The cloud computing system 802 may execute on, for example, an Amazon Web Services platform, a Microsoft Azure platform, or a Snowflake platform. The resource management component 804 may perform virtualization (e.g., abstraction) of computing hardware 803 to create the one or more virtual computing systems 806. Using virtualization, the resource management component 804 enables a single computing device (e.g., a computer or a server) to operate like multiple computing devices, such as by creating multiple isolated virtual computing systems 806 from computing hardware 803 of the single computing device. In this way, computing hardware 803 can operate more efficiently, with lower power consumption, higher reliability, higher availability, higher utilization, greater flexibility, and lower cost than using separate computing devices.

The computing hardware 803 may include hardware and corresponding resources from one or more computing devices. For example, computing hardware 803 may include hardware from a single computing device (e.g., a single server) or from multiple computing devices (e.g., multiple servers), such as multiple computing devices in one or more data centers. As shown, computing hardware 803 may include one or more processors 807, one or more memories 808, and/or one or more networking components 809. Examples of a processor, a memory, and a networking component (e.g., a communication component) are described elsewhere herein.

The resource management component 804 may include a virtualization application (e.g., executing on hardware, such as computing hardware 803) capable of virtualizing computing hardware 803 to start, stop, and/or manage one or more virtual computing systems 806. For example, the resource management component 804 may include a hypervisor (e.g., a bare-metal or Type 1 hypervisor, a hosted or Type 2 hypervisor, or another type of hypervisor) or a virtual machine monitor, such as when the virtual computing systems 806 are virtual machines 810. Additionally, or alternatively, the resource management component 804 may include a container manager, such as when the virtual computing systems 806 are containers 811. In some implementations, the resource management component 804 executes within and/or in coordination with a host operating system 805.

A virtual computing system 806 may include a virtual environment that enables cloud-based execution of operations and/or processes described herein using computing hardware 803. As shown, a virtual computing system 806 may include a virtual machine 810, a container 811, or a hybrid environment 812 that includes a virtual machine and a container, among other examples. A virtual computing system 806 may execute one or more applications using a file system that includes binary files, software libraries, and/or other resources required to execute applications on a guest operating system (e.g., within the virtual computing system 806) or the host operating system 805.

Although the remediation engine 801 may include one or more elements 803-812 of the cloud computing system 802, may execute within the cloud computing system 802, and/or may be hosted within the cloud computing system 802, in some implementations, the remediation engine 801 may not be cloud-based (e.g., may be implemented outside of a cloud computing system) or may be partially cloud-based. For example, the remediation engine 801 may include one or more devices that are not part of the cloud computing system 802, such as device 900 of FIG. 9, which may include a standalone server or another type of computing device. The remediation engine 801 may perform one or more operations and/or processes described in more detail elsewhere herein.

The network 820 may include one or more wired and/or wireless networks. For example, the network 820 may include a cellular network, a public land mobile network (PLMN), a local area network (LAN), a wide area network (WAN), a private network, the Internet, and/or a combination of these or other types of networks. The network 820 enables communication among the devices of the environment 800.

The user device 830 may include one or more devices capable of receiving, generating, storing, processing, and/or providing information associated with cloud-based applications, as described elsewhere herein. The user device 830 may include a communication device and/or a computing device. For example, the user device 830 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 830 may communicate with one or more other devices of environment 800, as described elsewhere herein.

The ticket management system 840 may include one or more devices capable of receiving, generating, storing, processing, and/or providing information associated with tickets, as described elsewhere herein. The ticket management system 840 may include a communication device and/or a computing device. For example, the ticket management system 840 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ticket management system 840 may include an issue tracking system, such as Jira or Bugzilla®, among other examples. The ticket management system 840 may communicate with one or more other devices of environment 800, as described elsewhere herein.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of the environment 800 may perform one or more functions described as being performed by another set of devices of the environment 800.

Figure 9:
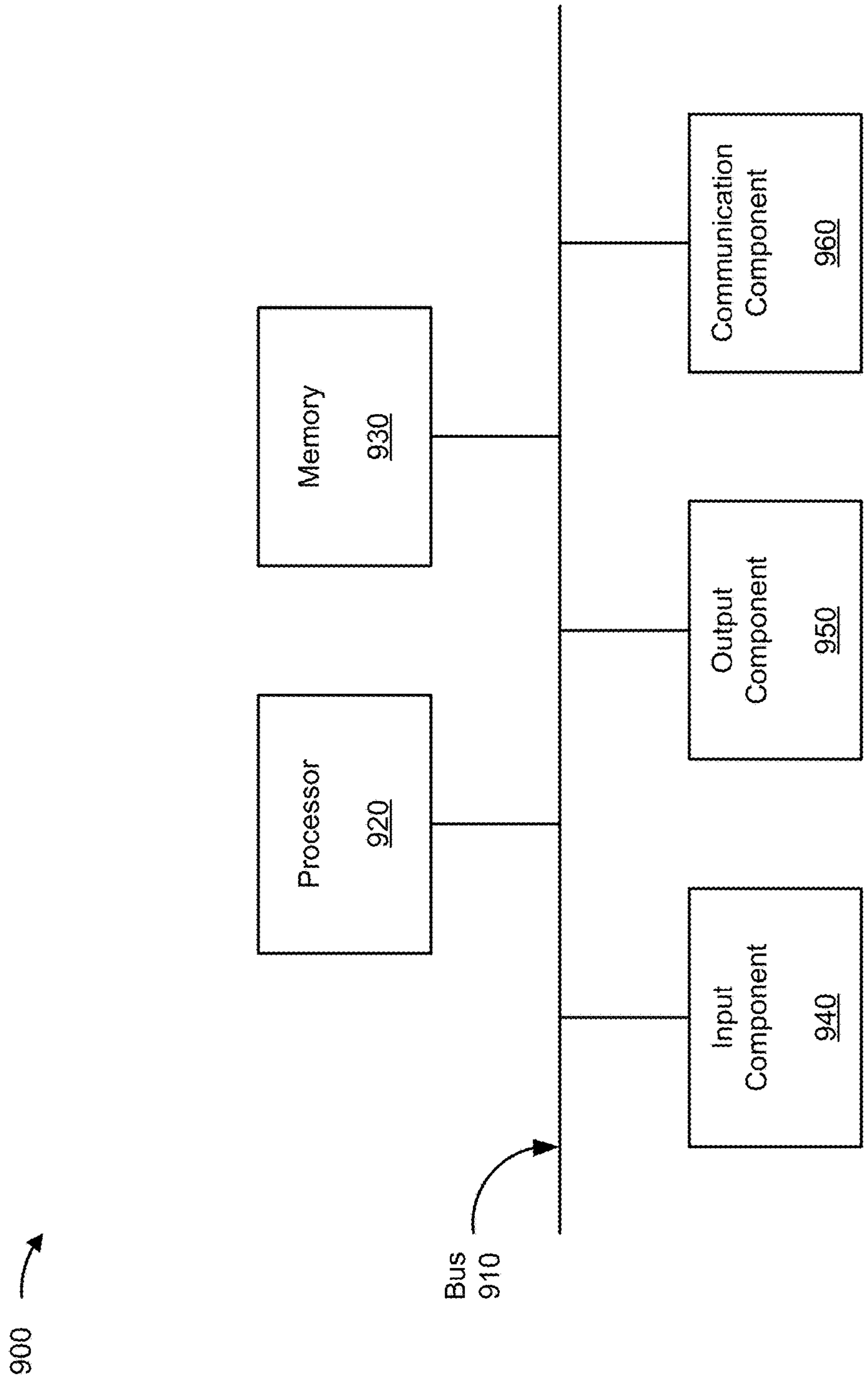
FIG. 9 is a diagram of example components of one or more devices of FIG. 8, in accordance with some embodiments of the present disclosure.

FIG. 9 is a diagram of example components of a device 900 associated with automated ticket creation and assignment for cloud-based applications. The device 900 may correspond to a user device 830 and/or a ticket management system 840. In some implementations, the user device 830 and/or the ticket management system 840 may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

Figure 10:
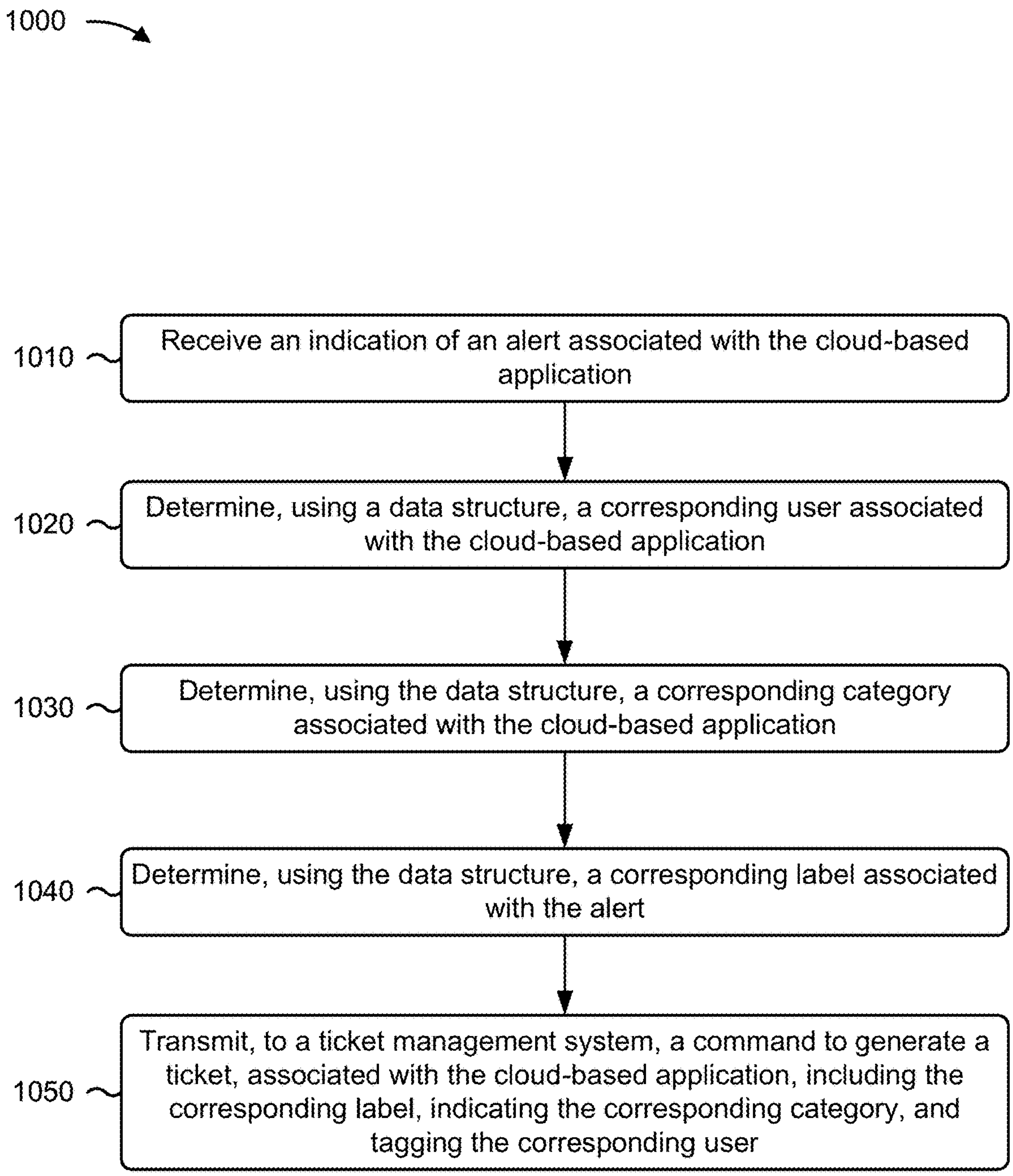
FIG. 10 is a flowchart of an example process relating to automated ticket creation and assignment for cloud-based applications, in accordance with some embodiments of the present disclosure.

FIG. 10 is a flowchart of an example process 1000 associated with automated ticket creation and assignment for cloud-based applications. In some implementations, one or more process blocks of FIG. 10 may be performed by the remediation engine 801. In some implementations, one or more process blocks of FIG. 10 may be performed by another device or a group of devices separate from or including the remediation engine 801, such as the user device 830 and/or the ticket management system 840. Additionally, or alternatively, one or more process blocks of FIG. 10 may be performed by one or more components of the device 900, such as processor 920, memory 930, input component 940, output component 950, and/or communication component 960.

As shown in FIG. 10, process 1000 may include receiving an indication of an alert associated with the cloud-based application (block 1010). For example, the remediation engine 801 (e.g., using processor 920, memory 930, input component 940, and/or communication component 960) may receive an indication of an alert associated with the cloud-based application, as described above in connection with reference number 305 of FIG. 3A. As an example, a cloud environment may transmit, and the remediation engine may receive, the indication of the alert associated with the cloud-based application. The alert may be associated with a security vulnerability experienced by the cloud-based application. Additionally, or alternatively, a cloud database may transmit, and the remediation engine may receive, information associated with the cloud-based application that indicates the security vulnerability.

As further shown in FIG. 10, process 1000 may include determining, using a data structure that maps application identifiers to user identifiers, a corresponding user associated with the cloud-based application (block 1020). For example, the remediation engine 801 (e.g., using processor 920 and/or memory 930) may determine, using a data structure that maps application identifiers to user identifiers, a corresponding user associated with the cloud-based application, as described above in connection with reference number 310 of FIG. 3A. As an example, the data structure may map identifiers of cloud-based applications (e.g., strings representing names of the applications) to identifiers of users (e.g., strings representing names, usernames, and/or email addresses, among other examples). Accordingly, the remediation engine may determine the corresponding user based on an identifier of the cloud-based application.

As further shown in FIG. 10, process 1000 may include determining, using the data structure, a corresponding category associated with the cloud-based application (block 1030). For example, the remediation engine 801 (e.g., using processor 920 and/or memory 930) may determine, using the data structure, a corresponding category associated with the cloud-based application, as described above in connection with reference number 310 of FIG. 3A. As an example, the data structure may map application identifiers to categories such that the remediation engine determines the corresponding category for the cloud-based application (e.g., by mapping a string representing the cloud-based application to a string representing the corresponding category).

As further shown in FIG. 10, process 1000 may include determining, using the data structure, a corresponding label associated with the alert (block 1040). For example, the remediation engine 801 (e.g., using processor 920 and/or memory 930) may determine, using the data structure, a corresponding label associated with the alert, as described above in connection with reference number 310 of FIG. 3A. As an example, the data structure may map application identifiers to labels such that the remediation engine determines the corresponding label for the alert (e.g., by mapping a string representing the cloud-based application to a string representing the corresponding label).

As further shown in FIG. 10, process 1000 may include transmitting, to a ticket management system, a command to generate a ticket, associated with the cloud-based application, including the corresponding label, indicating the corresponding category, and tagging the corresponding user (block 1050). For example, the remediation engine 801 (e.g., using processor 920, memory 930, and/or communication component 960) may transmit, to a ticket management system, a command to generate a ticket, associated with the cloud-based application, including the corresponding label, indicating the corresponding category, and tagging the corresponding user, as described above in connection with reference number 315 of FIG. 3B. As an example, the remediation engine may include the corresponding label and the corresponding category in the command such that the ticket indicates a correct label and category. Additionally, the remediation engine may indicate the corresponding user in the command such that the ticket tags the corresponding user. In some implementations, the remediation engine may include a corresponding project key in the command such that the ticket indicates a correct project key.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel. The process 1000 is an example of one process that may be performed by one or more devices described herein. These one or more devices may perform one or more other processes based on operations described herein, such as the operations described in connection with FIGS. 1A-1C, 2A-2C, 3A-3B, 4, 5A-5C, 6A-6B, and/or 7A-7B. Moreover, while the process 1000 has been described in relation to the devices and components of the preceding figures, the process 1000 can be performed using alternative, additional, or fewer devices and/or components. Thus, the process 1000 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for verifying a data structure for a cloud-based application, the set of instructions comprising:
- one or more instructions that, when executed by one or more processors of a device, cause the device to:
  - receive the data structure for the cloud-based application;
  - verify whether a team name, indicated in the data structure as associated with the cloud-based application, is included on a list of valid team names;
  - verify whether a user, indicated in the data structure as associated with the cloud-based application, is included on a list of valid users;
  - generate an updated data structure by indicating correct team names and users based on the verification;
  - automatically update the data structure by removing inactive entries; and
  - provide the updated data structure for processing alerts associated with the cloud-based application, based on verifying the team name and verifying the user.

2. The non-transitory computer-readable medium of claim 1, wherein the one or more instructions, when executed by the one or more processors, further cause the device to:
- update the data structure to indicate a backup user based on the user not being included on the list of valid users.

3. The non-transitory computer-readable medium of claim 2, wherein the backup user comprises a supervisor associated with the user.

4. The non-transitory computer-readable medium of claim 2, wherein the backup user is indicated in the data structure.

5. The non-transitory computer-readable medium of claim 1, wherein the one or more instructions, that cause the device to provide the updated data structure, cause the device to:
- store the data structure in a memory accessible to a device processing the alerts.

6. The non-transitory computer-readable medium of claim 1, wherein the one or more instructions, that cause the device to provide the updated data structure, cause the device to:
- provision an application programming interface (API) endpoint that permits access to the data structure.

7. The non-transitory computer-readable medium of claim 1, wherein the one or more instructions further cause the device to:
- integrate the data structure with a ticket management system to automate creation and assignment of tickets.

8. A system for verifying a data structure for a cloud-based application, the system comprising:
- one or more memories; and
- one or more processors, coupled to the one or more memories, configured to:
  - receive the data structure for the cloud-based application;
  - verify whether a team name, indicated in the data structure as associated with the cloud-based application, is included on a list of valid team names;
  - verify whether a user, indicated in the data structure as associated with the cloud-based application, is included on a list of valid users;
  - automatically update the data structure by removing inactive entries; and
  - provide the updated data structure for processing alerts associated with the cloud-based application, based on verifying the team name and verifying the user.

9. The system of claim 8, wherein the one or more processors are further configured to:
- update the data structure to indicate a backup user based on the user not being included on the list of valid users.

10. The system of claim 9, wherein the backup user comprises a supervisor associated with the user.

11. The system of claim 9, wherein the backup user is indicated in the data structure.

12. The system of claim 8, wherein the one or more processors, to provide the updated data structure, are configured to:

store the data structure in a memory accessible to a device processing the alerts.

13. The system of claim 8, wherein the one or more processors, to provide the updated data structure, are configured to:

provision an application programming interface (API) endpoint that permits access to the data structure.

14. A method of verifying a data structure for a cloud-based application, comprising:

receiving the data structure for the cloud-based application;

verifying whether a team name, indicated in the data structure as associated with the cloud-based application, is included on a list of valid team names;

verifying whether a user, indicated in the data structure as associated with the cloud-based application, is included on a list of valid users; and automatically updating the data structure by removing inactive entries for processing alerts associated with the cloud-based application, based on verifying the team name and verifying the user.

15. The method of claim 14, further comprising:

indicating a backup user in the data structure based on the user not being included on the list of valid users.

16. The method of claim 15, wherein the backup user comprises a supervisor associated with the user.

17. The method of claim 14, further comprising:

storing the updated data structure in a memory accessible to a device processing the alerts.

18. The method of claim 14, further comprising:

provisioning an application programming interface (API) endpoint that permits access to the updated data structure.

19. The method of claim 14, further comprising:

sending notifications to the users associated with the cloud-based application when the data structure is updated.

20. The method of claim 14, wherein verifying the team name and the user further comprises accessing a remote database comprising the list of valid team names and the list of valid users.

* * * * *